(12) United States Patent
Antony et al.

(10) Patent No.: US 7,774,243 B1
(45) Date of Patent: Aug. 10, 2010

(54) METHOD AND SYSTEM FOR PREDESTINATION ITEM TRANSFER AMONG AGENTS WITHIN A MATERIALS HANDLING FACILITY

(75) Inventors: Felix F. Antony, Issaquah, WA (US); François M. Rouaix, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1506 days.

(21) Appl. No.: 11/078,962

(22) Filed: Mar. 11, 2005

(51) Int. Cl.
*B65B 35/30* (2006.01)
*E04H 6/00* (2006.01)
*B65G 57/22* (2006.01)
*G06F 7/00* (2006.01)
*A01K 5/02* (2006.01)
*G06Q 10/00* (2006.01)

(52) U.S. Cl. .................. 705/28; 53/445; 414/243; 414/791.6; 700/216; 705/29

(58) Field of Classification Search ............ 53/445; 414/273, 791.6; 700/216; 705/28, 29
See application file for complete search history.

(56) References Cited

U.S. PATENT DOCUMENTS

| | | | | |
|---|---|---|---|---|
| 4,114,601 A | * | 9/1978 | Abels | 600/20 |
| 5,190,059 A | * | 3/1993 | Fabian et al. | 128/899 |
| 5,271,703 A | * | 12/1993 | Lindqvist et al. | 414/268 |
| 5,362,197 A | * | 11/1994 | Rigling | 414/807 |
| 5,395,206 A | * | 3/1995 | Cerny, Jr. | 414/807 |
| 5,636,966 A | * | 6/1997 | Lyon et al. | 414/791.6 |
| 5,720,157 A | * | 2/1998 | Ross | 53/445 |
| 5,931,824 A | * | 8/1999 | Stewart et al. | 604/358 |
| 6,061,607 A | * | 5/2000 | Bradley et al. | 700/216 |
| 6,076,007 A | * | 6/2000 | England et al. | 600/424 |
| 6,289,260 B1 | * | 9/2001 | Bradley et al. | 700/216 |
| 6,338,007 B1 | * | 1/2002 | Broadfield et al. | 700/231 |
| 6,366,206 B1 | * | 4/2002 | Ishikawa et al. | 340/573.1 |
| 6,377,867 B1 | * | 4/2002 | Bradley et al. | 700/216 |
| 6,400,272 B1 | * | 6/2002 | Holtzman et al. | 340/572.1 |

(Continued)

OTHER PUBLICATIONS

Author Unknown, Damark Announces Organizational and other Changes, May 30, 1995, PR Newswire.*

(Continued)

*Primary Examiner*—Matthew S Gart
*Assistant Examiner*—Talia Crawley
(74) *Attorney, Agent, or Firm*—Robert C Kowert; Meyertons, Hood, Kivlin, Kowert & Goetzel, P.C.

(57) ABSTRACT

A method and system for transferring selected items among agents within a materials handling facility. According to one embodiment, a method may include a number of agents moving along respective paths through an inventory storage area of a materials handling facility. While moving along a respective path, a first agent may select items from the inventory storage area to be delivered to a corresponding order processing area, where each of the selected items may be specified in a corresponding customer order and at least two of the selected items may be delivered to two different corresponding order processing areas. After the first agent selects a particular item, the first agent may transfer the particular item to a second agent, and the second agent or another one of the agents may deliver the particular item to the corresponding order finalization area.

48 Claims, 13 Drawing Sheets

U.S. PATENT DOCUMENTS

| | | | |
|---|---|---|---|
| 6,409,451 B1 * | 6/2002 | Fallin et al. | 414/282 |
| 6,421,580 B1 * | 7/2002 | Robrechts | 700/214 |
| 6,424,262 B2 * | 7/2002 | Garber et al. | 340/572.3 |
| 6,505,093 B1 * | 1/2003 | Thatcher et al. | 700/216 |
| 6,600,418 B2 * | 7/2003 | Francis et al. | 340/572.1 |
| 6,609,041 B1 * | 8/2003 | Sanka et al. | 700/115 |
| 6,615,092 B2 * | 9/2003 | Bickley et al. | 700/99 |
| 6,640,214 B1 * | 10/2003 | Nambudiri et al. | 705/26 |
| 6,647,316 B2 * | 11/2003 | Bahri et al. | 700/217 |
| 6,650,225 B2 * | 11/2003 | Bastian et al. | 340/5.92 |
| 6,669,089 B2 * | 12/2003 | Cybulski et al. | 235/385 |
| 6,768,419 B2 * | 7/2004 | Garber et al. | 340/572.4 |
| 6,809,645 B1 * | 10/2004 | Mason | 340/572.1 |
| 6,853,876 B2 * | 2/2005 | Wehrung et al. | 700/230 |
| 6,861,954 B2 * | 3/2005 | Levin | 340/572.1 |
| 6,900,731 B2 * | 5/2005 | Kreiner et al. | 340/572.1 |
| 6,950,722 B2 * | 9/2005 | Mountz | 700/214 |
| 7,019,650 B2 * | 3/2006 | Volpi et al. | 340/572.1 |
| 7,035,877 B2 * | 4/2006 | Markham et al. | 707/200 |
| 7,038,573 B2 * | 5/2006 | Bann | 340/10.1 |
| 7,110,855 B2 * | 9/2006 | Leishman | 700/216 |
| 7,123,975 B2 * | 10/2006 | Chen | 700/96 |
| 7,139,637 B1 * | 11/2006 | Waddington et al. | 700/216 |
| 7,142,118 B2 * | 11/2006 | Hamilton et al. | 340/572.1 |
| 7,177,825 B1 * | 2/2007 | Borders et al. | 705/26 |
| 7,212,976 B2 * | 5/2007 | Scheer | 705/1 |
| 7,307,530 B2 * | 12/2007 | Fabian et al. | 340/572.1 |
| 7,557,710 B2 * | 7/2009 | Sanchez et al. | 340/572.1 |
| 2002/0021954 A1 * | 2/2002 | Winkler | 414/273 |
| 2002/0067263 A1 * | 6/2002 | Tafoya et al. | 340/572.1 |
| 2002/0087231 A1 * | 7/2002 | Lewis et al. | 700/230 |
| 2002/0143320 A1 * | 10/2002 | Levin | 606/1 |
| 2003/0066537 A1 * | 4/2003 | Fabian et al. | 128/899 |
| 2003/0105394 A1 * | 6/2003 | Fabian et al. | 600/407 |
| 2003/0233289 A1 * | 12/2003 | Yang et al. | 705/28 |
| 2004/0084525 A1 * | 5/2004 | Kreiner et al. | 235/384 |
| 2004/0129279 A1 * | 7/2004 | Fabian et al. | 128/899 |
| 2004/0201479 A1 * | 10/2004 | Garber et al. | 340/572.1 |
| 2004/0250819 A1 * | 12/2004 | Blair et al. | 128/899 |
| 2005/0047895 A1 * | 3/2005 | Lert, Jr. | 414/273 |
| 2005/0238467 A1 * | 10/2005 | Minges | 414/462 |
| 2006/0206235 A1 * | 9/2006 | Shakes et al. | 700/216 |
| 2007/0093709 A1 * | 4/2007 | Abernathie | 600/407 |
| 2007/0290030 A1 * | 12/2007 | Fox et al. | 235/375 |

OTHER PUBLICATIONS

Authur Unknown, Peak Technologies introduces Peak Compliance, Mar. 3, 1998, PR Newswire.*
U.S. Patent Application Serial No. 11/078,252 filed Mar. 11, 2005.
"Clever Shopping Cart Aids Net Grocery Service," News.com, CNET Networks, Inc., Dec. 8, 2004, 3 pages.

* cited by examiner

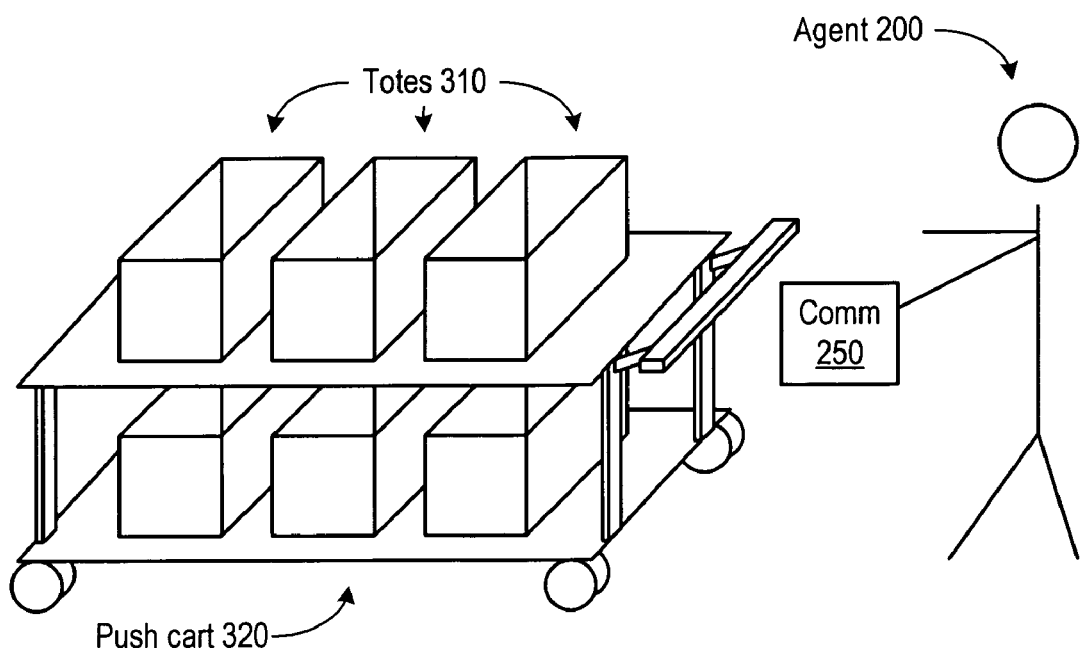
FIG. 2
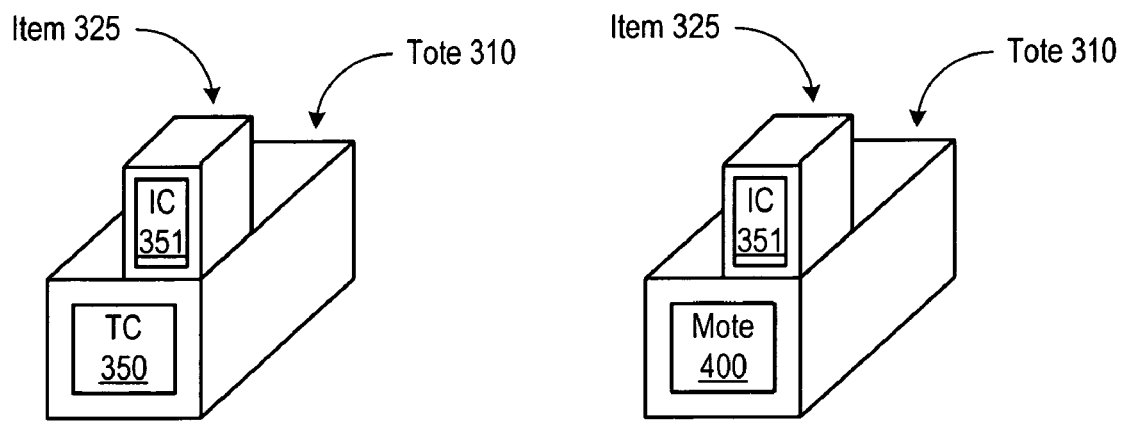
FIG. 3A
FIG. 3B

METHOD AND SYSTEM FOR PREDESTINATION ITEM TRANSFER AMONG AGENTS WITHIN A MATERIALS HANDLING FACILITY

BACKGROUND OF THE INVENTION

1. Field of the Invention

This invention relates to materials handling systems and, more particularly, to selection and conveyance of material within a materials handling system.

2. Description of the Related Art

An enterprise that receives, consumes, transforms or distributes material during the course of its operations may implement a materials handling system to coordinate how material is managed within the enterprise. For example, in a manufacturing context, material may include raw materials, feedstocks, parts, etc. that may arrive at a manufacturing facility for processing as well as intermediate or finished goods resulting from the manufacturing process. Similarly, in a distribution context, retailers, wholesalers and other types of distributors may receive materials such as goods or products and distribute them to clients or customers.

Material may be stored as inventory within an inventory facility and made available for ordering or use by clients or customers. For example, in a manufacturing context, a client may include a step of a manufacturing process that includes a particular type of material as an input, while in a retail context, a client may include a customer who places an order for a product. Often, like items are stored together within inventory to facilitate inventory tracking and management. For example, items having a common Universal Product Code (UPC), Stock-Keeping Unit (SKU) code, or other designation (including proprietary designations) may be stored together within inventory.

When retrieval of material from inventory is necessary, for example in response to a client's order or to replenish a manufacturing process, one or several inventory items must be retrieved or "picked" from inventory and prepared for delivery to the requestor or recipient. In an inventory environment that includes a large number of many different items, multiple different items may be concurrently requested or ordered by the same requestor. For example, a customer may place an order for a number of dissimilar items, or a process may require a number of different materials before it can proceed. In such cases, it may be highly inefficient for a single employee or agent to pick every item for a given order. For example, the different items specified by a given order may be stored at mutually remote locations within the inventory facility, which would require a single picker to traverse a long path through the facility.

To improve productivity, a materials handling system may use multiple item pickers distributed throughout an inventory facility, such that more than one picker may select items for a given order. Such a division of labor may reduce the overall time required to complete picking for a given order in comparison to a single picker traversing the entire facility. However, while reducing the overall time to pick a particular order through division of labor may increase the efficiency of completing that particular order, it may in some instances only marginally increase the overall efficiency of the pickers involved. For example, an item picker instructed to pick portions of multiple different orders may still traverse a long path through the inventory facility relative to the number of items picked.

Further, dividing orders for material from a single requestor among multiple pickers requires that the items be subsequently sorted to associate the proper items with each requestor. For example, a given customer may place an order specifying multiple items. Each of several pickers may select an aggregation of items, where different ones of the items specified in the given order may be selected by different pickers. Consequently, a subsequent sort operation to select the proper items for the given order from the aggregations of items returned by each respective picker is required. Such sorting may be labor intensive if performed manually. Mechanical sorting solutions exist that are suitable for sorting certain types of inventory items according to individual orders (e.g., the Crisplant® sorter). However, such solutions are typically expensive in both cost and floor area. Implementations using such solutions typically do not scale well as inventory throughput demands increase, since implementing a fractional solution is often impractical if not impossible. For example, to address a 30-40% increase in order throughput requirement may require purchasing an entire new sorting system, effectively doubling throughput capacity despite leaving 60-70% of the new capacity unutilized. Finally, even if manual sorting is employed, pickers may still need to convey their picked items to the sorting area(s). Such conveying may require pickers to spend a substantial amount of time in transit within an inventory facility, which may decrease time available for picking items for other orders.

SUMMARY

Various embodiments of a method and system for transferring selected items among agents within a materials handling facility are disclosed. In one embodiment an agent moving through an inventory storage area, such as a fulfillment center, may be instructed to pick items either currently in its general vicinity or in the vicinity of the future path the agent is expected (or instructed) to follow. By planning the picking of items for orders according to the proximity of various items to various agents circulating throughout the fulfillment center, it may be possible to minimize the average distance that an agent 200 may travel without picking an item or performing another productive act, such as delivering items to a processing area or restocking items within the inventory storage area.

A highly productive path for picking items may be planned for a given agent, but once the items have been picked, they generally still need to be delivered to one or several processing areas or other destinations in order to complete fulfillment of corresponding orders. Such processing areas may be widely distributed through a fulfillment center, and/or a processing area may be some distance from the agent's position. In some embodiments, rather than each agent transporting each of its picked items directly to its corresponding processing area, agents may be instructed or configured to transfer or exchange items among one another, taking into account the planned paths and other state information associated with the agents involved in the exchange. Thus, one agent may pick an item for a particular order, where the item has a corresponding processing area that is on the path of another agent. The first agent may therefore exchange it with the other agent for delivery to the processing area. Alternatively, if other items remain to be picked for the particular order, and some of the other items are on the path of the other agent, the other agent may continue picking items for the particular order subsequent to the exchange. In some embodiments, keeping all picked items corresponding to a particular order together during the exchange process (e.g., by exchanging entire containers including items corresponding to a single order) may obviate the need to sort items according to orders after picking is complete, or to sort items during an exchange.

In some instances, two agents may reciprocally exchange items based on criteria similar to those described above. In other instances, the exchange may be performed as a unidirectional transfer, with one agent only receiving items from another agent. It is possible that several different exchanges between agents may occur for a given item between the time it is picked and the time it is delivered to a processing area. Depending on factors such as the various paths traveled by each of the agents involved in transporting the given item, the other items in the same order as the given item, and other considerations, the resulting trajectory followed by the given item between its storage location and its processing area may range from relatively direct to serpentine. For example, in one embodiment, if the given item is part of a particular order of numerous items scattered throughout a fulfillment center, the given item may be exchanged many times as its corresponding container visits each storage location corresponding to the various items of the particular order. However, it is noted that while the given item may traverse a lengthy path through the fulfillment center as picking for its order progresses, in an exchange-based system, the individual agents involved with picking the particular order may move relatively little in comparison with the given item or at least individually follow different paths.

In some embodiments, agents may be instructed to convey incoming inventory items from receiving areas of a fulfillment center to various storage areas for restocking. It is contemplated that in some embodiments, item exchange as described above in the context of item picking may also be employed among agents during the restocking process. That is, exchanges of items among agents may occur for both inbound and outbound items within fulfillment center. Further, individual agents may in some instances perform both picking and restocking functions with respect to different items. Whether a given item has already been picked, is to be restocked, or is part of a single- or multiple-item order may be transparent to a given agent.

In one particular embodiment, a method of agent exchange-based order fulfillment may include a number of agents moving along respective paths through an inventory storage area of a materials handling facility. While moving through the inventory storage area, a portion of the number of agents may respectively select one or more of a number of items stored within the inventory storage area, where each one of the selected items is specified in a corresponding customer order or materials request. The method may also include conveying the selected items to one or more corresponding processing areas of the materials handling facility in order to fulfill the corresponding customer orders. Further, at least some of the selected items may be exchanged one or more times among the agents in the course of being conveyed to corresponding processing areas.

BRIEF DESCRIPTION OF THE DRAWINGS

FIG. 2 is a block diagram illustrating one embodiment of an agent configured to traverse a path through a fulfillment center.

FIGS. 3A-B are block diagrams illustrating exemplary embodiments of totes configured to carry items.

Figure 1:
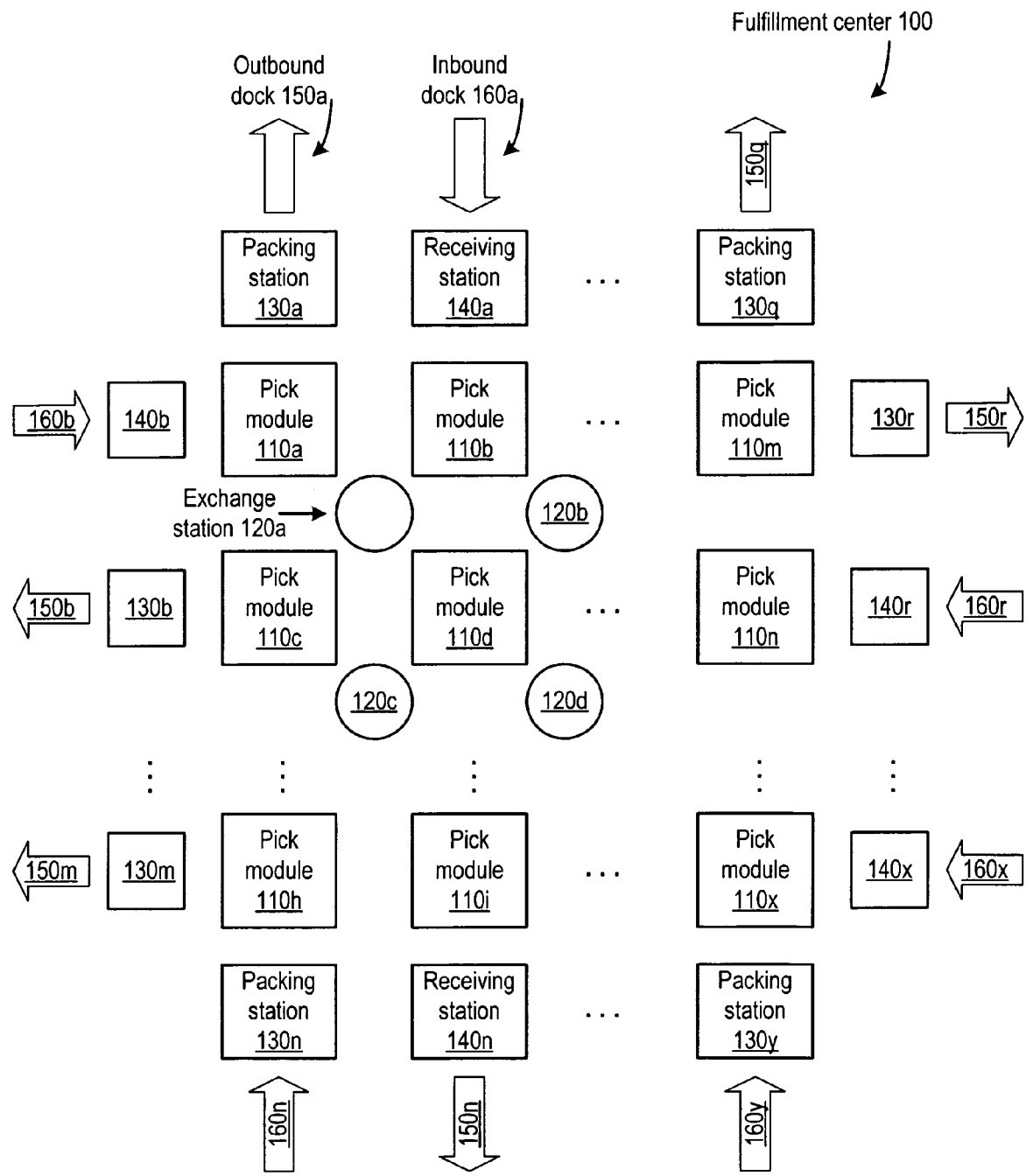
FIG. 1 is a block diagram illustrating one embodiment of a fulfillment center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As summarized above, in some embodiments agent exchange-based materials handling may improve the overall productivity of a materials handling process. Various embodiments of agent exchange-based materials handling, including various components of systems that may be configured to implement exchange-based materials handling, are described in detail below. Owing to the complexity of the disclosed system, discussion is divided into several sections to facilitate exposition. However, it is noted that embodiments of the system are not limited by the section headings or the particular order in which aspects of the system are described. Further, it is noted that in the following discussion, materials handling is described in the context of fulfillment of customer orders from a fulfillment center configured to store inventory items. However, it is intended that the terms "order fulfillment" and "fulfillment center" encompass any type of materials handling system in which material is stored and selected in response to a request or order.

First, an overview of an exemplary fulfillment center embodiment is provided. It is contemplated that multiple agents may operate concurrently within a fulfillment center to implement agent exchange-based order fulfillment. The configuration and behavior of a single exemplary agent operating within a fulfillment center is described first. Exchange interactions among multiple such agents operating concurrently are then discussed. An exemplary control system embodiment configured to coordinate the actions of multiple agents is then described, along with an exemplary technique for computational representation and modeling of agent actions.

Fulfillment Center Overview

An inventory facility in which inventory selection for order fulfillment occurs may also be referred to as a fulfillment center. FIG. 1 illustrates an overhead schematic view of one embodiment of a fulfillment center. In the illustrated embodiment, fulfillment center 100 includes an arbitrary number of pick modules 110, shown as pick modules 110*a-y*, interspersed with an arbitrary number of exchange stations 120*a-d*. In the illustrated embodiment, pick modules 110 and exchange stations 120 are arranged as a grid, but it is contemplated that in other embodiments, any suitable arrangement of pick modules 110 and exchange stations 120 may be used, including non-rectilinear arrangements. Surrounding the periphery of pick modules 110 and exchange stations 120 are an arbitrary number of packing stations 130 and receiving stations 140, shown as packing stations 130*a-r* and receiving stations 140*a-x*, respectively. Some instances of each of the aforementioned elements have been omitted for clarity.

In the illustrated embodiment, each packing station 130 is associated with a corresponding outbound dock 150, and each receiving station 140 is associated with a corresponding inbound dock 160. Further, in the illustrated embodiment, packing stations 130 and receiving stations 140 are interspersed in an alternating fashion. That is, material input to and output from fulfillment center 100 may be distributed along the periphery of fulfillment center 100 rather than designating one entire end of fulfillment center 100 for input and another end for output. However, in other embodiments, there need not be a one-to-one association between inbound or outbound docks and receiving or shipping stations, and packing stations 130 may be arranged in a different order with respect to receiving stations 140. Additionally, it is contemplated that in some embodiments, packing stations 130 and receiving stations 140 may be arranged around fewer than all boundaries or edges of fulfillment center 100. For example, in some embodiments these stations may be arranged only on the horizontal or vertical edges of fulfillment center 100, etc.

Pick modules 110 may be configured to store inventory items in a variety of ways. In some embodiments, each pick module 110 may include a single storage bin or a collection of storage bins suitable for storing items small enough to fit within the bin. In one embodiment, all storage bins used by pick modules 110 may be of the same size, whereas in other embodiments bin size may vary across pick modules 110 (or within a single, multiple-bin pick module 110). A given storage bin may be configured to store only units of the same item, or may alternatively store units of different items.

Not all pick modules 110 necessarily use storage bins. In some embodiments, a pick module 110 may include a pallet of items more or less as the pallet was received from a supplier (e.g., without substantial rearrangement or binning). Alternatively, a pick module 110 may include one or more chutes configured to readily dispense an item from one end. In various embodiments, such chutes may be configured to assist item flow and dispensing using gravity or spring loading of items, for example. In still other embodiments, a pick module 110 may include one or more freestanding inventory items. For example, bulky or heavy items may be situated on individual pallets or platforms, and one or more such items may be situated at a pick module 110.

Packing stations 130 and receiving stations 140 may generally be configured to perform processing of items as they leave and enter fulfillment center 100. Packing stations 130 and receiving stations 140 may also be referred to generically as order processing stations or areas. (The role of exchange stations 120 is described below in conjunction with the description of FIG. 4.) In one embodiment, a packing station 130 (which may also be referred to generally as an order finalization area) may be configured for packaging inventory items for a given customer order for shipment to a customer (e.g., via a common carrier). For example, in one embodiment a particular packing station 130 may be configured to automatically package items of a certain type, such as books, compact disks (CDs), digital video disks (DVDs) or other items having certain dimensions or characteristics. In another embodiment, a packing station 130 may include boxes or box-constructing materials as well as other materials (e.g., filler material, dunnage, etc.) for items to be manually packaged. It is noted that a customer for a given order may be any entity that may place or request an order for one or more items, or have such an order placed or requested on its behalf. For example, a customer may be an individual or an organization. A customer may also be a virtual entity having a material input of some kind. For example, a customer may be a particular step or stage of a manufacturing, assembly or other type of process.

Packing stations 130 may also include facilities for printing package labels or otherwise addressing or identifying packages, for printing and inserting packing slips, invoices, or other paperwork, and/or for inserting brochures or other promotional items into packages. It is contemplated that in some embodiments, different packing stations 130 may be configured for handling different types of items, while in other embodiments packing stations 130 may be configured to process any type of item. In some embodiments, some items may be processed at several different packing stations 130. For example, in one embodiment boxing may occur at one packing station 130, while addressing occurs at another packing station 130. It is noted that in some embodiments, packing station 130 need not pack items specifically for shipment, but instead for other modes of delivery to a customer. For example, in one embodiment fulfillment center 100 may be configured to service walk-in customers instead of or in addition to shipment to customers. In such an embodiment, items in an order for a walk-in customer may simply be bagged or placed in a cart for direct delivery to the customer. In some embodiments, packing stations 130 may be configured to prepare items for a stage of processing other than shipment. For example, in an embodiment where items picked from inventory are to be used as inputs to another process such as an assembly process, packing stations 130 may be configured to perform preparatory steps for the subsequent process, such as removing items from the packaging in which they were stored.

Once processing of one or more picked items at a packing station 130 is complete, the resulting package or collection of picked items may leave fulfillment center 100 via one of outbound docks 150. In one embodiment, a given outbound dock 150 may lead directly to a vehicle, such as a truck operated by a private or common carrier, for example, for eventual transportation to a customer. In other embodiments, outbound docks 150 may lead to other areas of a plant or facility. In some embodiments, packages may be redirected from a particular packing station 130 to an outbound dock 150 other than the dock closest to the particular packing station 130. For example, packages may be sorted to different outbound docks 150 based on the destination of the package. In other embodiments, items may be effectively sorted by destination prior to packaging, for example by directing picked items to the packing station 130 closest to the desired outbound dock 150. A combination of these techniques may be employed to optimize utilization of packing stations 130 and outbound docks 150.

Incoming shipments may arrive at the illustrated embodiment of fulfillment center 100 via inbound docks 160, and may be processed by receiving stations 140 prior to being conveyed to pick modules 110 for storage as inventory. For example, truckloads of incoming shipments may be unloaded at inbound docks 160. At receiving stations 140, certain types of incoming items may be unpacked and/or rearranged, although other types of items may require minimal physical processing prior to being placed. For example, some incoming items may be sorted into bins or containers for transfer to pick modules 110, while other items may be left in their original packing, left on pallets, etc. In addition to physical processing of incoming shipments, receiving stations 140 may be configured to register and/or inspect inbound inventory items. For example, individual items or groups of items may be scanned or tallied in order to update inventory records corresponding to those items. In some embodiments, identifiers such as bar codes, radio frequency identification (RFID) tags or other identifiers may be applied to pallets, boxes or individual items at receiving stations 140, or existing identifiers (e.g., placed on items by a manufacturer or supplier) may be reused.

In some embodiments, it is contemplated that the area in which inventory items are stored within fulfillment center 100 (e.g., a collection of pick modules 110) may constitute a separate and distinct area from an are in which inventory items are processed within fulfillment center 100 (e.g., packing stations 130 and receiving stations 140). For example, in one embodiment inventory items may be stored in a central area of fulfillment center 100 and processed at the periphery of fulfillment center 100. In other embodiments, it is contemplated that inventory processing areas may be interspersed among inventory storage areas, and/or the boundary between the two types of areas may be diffuse. It is also contemplated that in some embodiments, items may be transported beyond the boundary of fulfillment center 100 by agents operating within fulfillment center. For example, in one embodiment fulfillment center 100 may be an inventory management facility internal to a manufacturing enterprise having a manufacturing area (not shown) distinct from fulfillment center 100. In such an embodiment, an agent such as described below may convey items from fulfillment center 100 directly to the manufacturing area without necessarily stopping at a processing area of fulfillment center 100 or tendering the items to a different agent at the boundary of fulfillment center 100.

Individual Agent Overview

Generally speaking, in the illustrated embodiment of fulfillment center 100, as inventory items arrive, they may follow a restocking process, flowing from inbound docks 160 to pick modules 110 via receiving stations 140. Further, as inventory items are ordered by customers, they may follow a picking process, flowing from pick modules 110 to outbound docks 150 via packing stations 130. It is noted that in some embodiments, items may be picked in anticipation of a customer order, i.e., before the order occurs. As used herein, "customer order" is intended to encompass both actual requests for material generated by customers as well as anticipated requests. In some embodiments, the restocking and/or picking processes may be carried out by agents traveling along respective paths through fulfillment center 100. One embodiment of an agent is illustrated in FIG. 2. In the illustrated embodiment, agent 200 may be an employee with a push cart 320 configured to hold a plurality of storage bins or totes 310.

In various embodiments, the number and arrangement of totes 310 may vary from that shown. Further, agent 200 may interact with a corresponding communication device 250, which may be a handheld device, a device worn by or attached to the agent, or a device integrated into or mounted on push cart 320 in various embodiments.

Communication device 250 may be configured to convey instructions to agent 200 as to what actions to perform within fulfillment center 100. For example, in one embodiment communication device 250 may receive (e.g., from a control system, such as that shown in FIG. 4 and described below) a list of items to be picked from a particular set of pick modules 110, and may present the items to pick and the pick modules 110 to agent 200 via a display portion of the device such as a screen. In response to receiving instructions to pick various items, agent 200 may navigate push cart 320 to the first indicated pick module 110 (or, alternatively, to the closest indicated pick module 110 if the indicated pick modules 110 are not specifically ordered by the control system). Alternatively, as described in greater detail below, in some embodiments agents 200 may travel predetermined paths through fulfillment center 100, and a given agent 200 may receive instructions to pick various items dependent upon its proximity to a particular pick module 110, the current state of its push cart 320 (e.g., whether it has spare capacity within totes 310 or can perform an exchange with another agent 200 prior to reaching the particular pick module 110, as described subsequently).

Once at an indicated pick module 110, agent 200 may select an instance of an indicated item from the indicated pick module 110. For example, agent 200 may retrieve an item from a bin, pallet, chute, or other configuration of pick module 110. In some cases, agent 200 may also inspect the condition of the item, and may select an item only if it is in suitable condition (e.g., is clean, undamaged, unopened, or satisfies some other set of criteria).

Once an item has been selected, agent 200 may deposit the selected item in a particular tote 310. In some embodiments, such as illustrated in FIG. 3A, a tote 310 may have a corresponding tote code (TC) 350, which may include a bar code, RFID tag or other type of code that uniquely identifies a given tote 310 among those in use within fulfillment center 100. In one embodiment, agent 200 may select a free tote 310 into which to put a newly selected item and may scan or otherwise input the corresponding tote code 350 into communication device 250 to indicate the selected tote 310. Alternatively, communication device 250 may specify a particular tote code 350 to identify the tote 310 into which an indicated item should be placed. It is contemplated that in some embodiments, some or all totes 310 may be configured to include individual compartments or segregated areas, each of which may hold one or more items separately from items in other compartments or areas. In some such embodiments, each compartment or separate area within a tote 310, or arbitrary groupings of such compartments or areas, may be treated as an independent tote 310 with respect to item picking. Such compartmentalization of totes 310 may increase the flexibility in picking items of different sizes, or picking for orders with different quantities of items.

In FIG. 3A, tote 310 is shown with an exemplary item 325 stored therein. In the illustrated embodiment, item 325 includes an item code (IC) 351, which like tote code 350, may include a bar code, RFID tag or other type of code. In some embodiments, item code 351 may uniquely identify each individual instance of item 325, akin to a unique serial number, while in other embodiments item code 351 may uniquely identify only the type of item 325. In different embodiments, item code 351 may be scanned or input into communication device 250 instead of or in addition to tote code 350 when an item is selected.

In some embodiments, identifying a particular tote 310 into which an item 325 should be placed may be facilitated by incorporating active technology into tote 310. In the embodiment illustrated in FIG. 3B, rather than a tote code 350 that passively identifies a particular tote 310, tote 310 includes a mote 400. In one embodiment, a mote 400 may include an indicator device, such as a light emitting diode (LED), as well as a communication interface, such as a wireless network interface. Each mote 400 may be identified by a unique code, similar to tote code 350, such that when a particular mote 400 receives a message via its communication interface, it may responsively activate its indicator device. For example, in one embodiment, in response to agent 200 arriving at an indicated pick module 110, the central control system or communications device 250 may send a message to a particular mote 400, causing it to illuminate an LED to indicate to agent 200 the specific tote 310 into which a selected item 325 should be placed. In some embodiments, a mote 400 may be further configured to detect when item 325 has been placed into a tote 310, for example through the use of a motion detector, RFID sensor, or other technique. It is contemplated that in some embodiments, motes 400 may include more sophisticated elements such as a simple microprocessor or embedded microcontroller, and may be capable of executing software routines that manage the communications and indicator functions as well as other possible functions. It is further contemplated that similar motes 400 may be implemented by pick modules 110, for example to facilitate identification of a specific pick module 110 from which an indicated item 325 should be selected.

It is noted that numerous different embodiments of communication device 250 are possible and contemplated. In some embodiments, communication device 250 may include a portable general-purpose computer system configured to execute an operating system and one or more applications, while in other embodiments, communication device 250 may include an embedded computer system configured to execute customized software applications. In various embodiments, communication device 250 may support numerous different interface mechanisms, such as video displays of various sizes and resolutions, audio input/output capabilities (e.g., for voice communication), optical (e.g., bar code) scanning devices, RFID detectors, wireless or wired network interfaces, or various combinations of these, which may be directly integrated within communication device 250 or implemented by separate devices interfaced with communication device 250. In some embodiments, communication device 250 may not include general-purpose-computer-related functionality, but may instead include a simple voice interface with a dispatcher or control system (e.g., a one-way or two-way radio or a wireless or cellular phone).

It is further noted that in some embodiments, the actions of agent 200 may be partially or completely performed by an autonomous robot. For example, in some embodiments both item picking and transportation may be performed robotically, whereas in other embodiments items may be picked by human employees while robotic push carts 320 operate independently of the human pickers. Alternatively, push carts 320 may be replaced with other conveyance systems such as such as conveyor belts, track-based carts, etc., or some agents 200 may carry one or more totes 310 without the use of a push cart 320. As noted above, in embodiments employing push carts 320, the configuration of totes 310 may vary in various embodiments. For example, push carts 320 may have more or fewer totes 310 than shown, and totes 310 may be arranged in different fashions, such as by varying the angle at which totes 310 are mounted in order to facilitate access to totes 310 at various heights on carts 320.

Item/Tote Exchange and the Fulfillment Process

As noted above, the more time an agent 200 spends moving through fulfillment center 100 without picking items, the less efficient that agent 200 may be. For example, if an agent 200 were instructed to pick items 325 on the basis of complete orders (e.g., to pick most or all of the items in a given order), the agent 200 may spend a substantial amount of time moving between pick modules 110, particularly if the items 325 are scattered throughout fulfillment center 100. By contrast, in one embodiment an agent 200 may be instructed to pick items 325 either currently in its general vicinity or in the vicinity of the future path the agent 200 is expected (or instructed) to follow. By planning the picking of items for orders according to the proximity of various items 325 to various agents 200 circulating throughout fulfillment center 200, it may be possible to minimize the average distance that an agent 200 may travel without picking an item 325 or performing another productive act, such as delivering item(s) 325 to a packing station 130 or stowing or restocking an item 325 (as described below).

A highly productive path for picking items 325 may be planned for a given agent 200, but once the items 325 have been picked, they generally still need to be delivered to one or several packing stations 130 or other destinations in order to complete fulfillment of corresponding orders. Just as items 325 specified in an order may be widely distributed throughout fulfillment center 100, the packing stations 130 for the various different orders for which an agent 200 has picked items 325 may be widely distributed. Alternatively, at the time an agent 200 finishes picking a number of items 325, the agent 200 may be some distance from the nearest packing station 130 (e.g., agent 200 may be in the middle of fulfillment center 100). Like the item-picking case described above, an agent 200 may have to travel a considerable distance in order to transport all of its picked items 325 directly to corresponding packing stations 130, which may diminish agent productivity.

In some embodiments of fulfillment center 100, rather than each agent 200 transporting each of its picked items 325 directly to its corresponding packing station 130, agents 200 may be instructed or configured to transfer or exchange items 325 among one another, taking into account the planned paths and other state information associated with the agents 200 involved in the exchange. That is, after an agent 200 picks a given item 325, rather than transport the given item 325 to a packing station 130, the agent 200 may exchange the given item 325 (or, as described below, the tote 310 into which the given item 325 was placed) with an item 325 or tote 310 in the possession of another agent 200. For example, a first agent 200 may encounter a second agent 200 whose planned path takes the second agent near a particular packing station 130. The first agent 200 may then be instructed to exchange one or more items 325 or full totes 310 (i.e., totes including all items 325 for a particular order) with the second agent 200, so that the second agent 200 may deliver the exchanged items 325 to the particular packing station 130 on behalf of the first agent.

Alternatively, the first agent 200 may have picked one or more items 325 corresponding to a particular order, and the planned path of the second agent 200 may take it near the location of a pick module 110 containing another item 325 corresponding to the particular order. The first agent 200 may then be instructed to exchange the items 325 (or tote 310) corresponding to the particular order with the second agent 200, which may then continue picking items 325 for the particular order. As described in greater detail below, it is noted that in some embodiments, keeping all picked items 325 corresponding to a particular order together during the exchange process (e.g., by exchanging entire totes 310 including items corresponding to a single order) may obviate the need to sort items 325 according to orders after picking is complete.

In some instances, the second agent 200 may reciprocally exchange items 325 with the first agent 200 based on criteria similar to those described above. In other instances, the exchange may be performed as a unidirectional transfer, with the second agent 200 only receiving items 325 from the first agent 200, or vice versa. In some embodiments, a unidirectional transfer may be implemented as a reciprocal exchange of totes 310, where one of the exchanged totes 310 is empty. Such exchanging of empty totes 310 for totes containing items 325 may facilitate the redistribution of empty totes from the periphery of fulfillment center 100 (e.g., from packing stations 130) towards pick modules 110, where they may be used for picking items 325 for new orders. In either the reciprocal or unidirectional cases, it is noted that the state of each agent 200 (e.g., the specific items 325 or totes 310 in its possession) may be altered by the exchange.

It is possible that several different exchanges between agents 200 may occur for a given item 325 between the time it is picked and the time it is delivered to a packing station 130. Depending on factors such as the various paths traveled by each of the agents 200 involved in transporting the given item 325, the other items 325 in the same order as the given item 325, and other considerations, the resulting trajectory followed by the given item 325 between its pick module 110 and its packing station 130 may range from relatively direct to serpentine. For example, if the given item 325 is part of a particular order of numerous items 325 scattered throughout fulfillment center 100, given item 325 may be exchanged many times as its corresponding tote 310 visits each pick module 110 corresponding to the various items 325 of the particular order. However, it is noted that while given item 325 may traverse a lengthy path through fulfillment center 100 as picking for its order progresses, in an exchange-based system, the individual agents 200 involved with picking the particular order may move relatively little in comparison with given item 325. This may in turn increase the picking density of each agent 200, making the overall picking process more efficient.

In some embodiments, as noted above, agents 200 may be instructed to convey incoming inventory items 325 from receiving stations 140 to various pick modules 110 for restocking, which may also be referred to as stowing. It is contemplated that in some embodiments, item exchange as described above in the context of item picking may also be employed among agents 200 during the restocking process. That is, exchanges of items 325 among agents 200 may occur for both inbound and outbound items 325 within fulfillment center 100. Further, individual agents 200 may in some instances perform both picking and restocking functions with respect to different items 325. Whether a given item 325 has already been picked, is to be restocked, or is part of a single- or multiple-item order may be transparent to a given agent 200. It is contemplated that in some embodiments, items 325 for single-item orders as well as multiple-item orders may be picked, transferred, and ultimately conveyed to a packing station 130 using the same general flow described below.

Figure 4A:
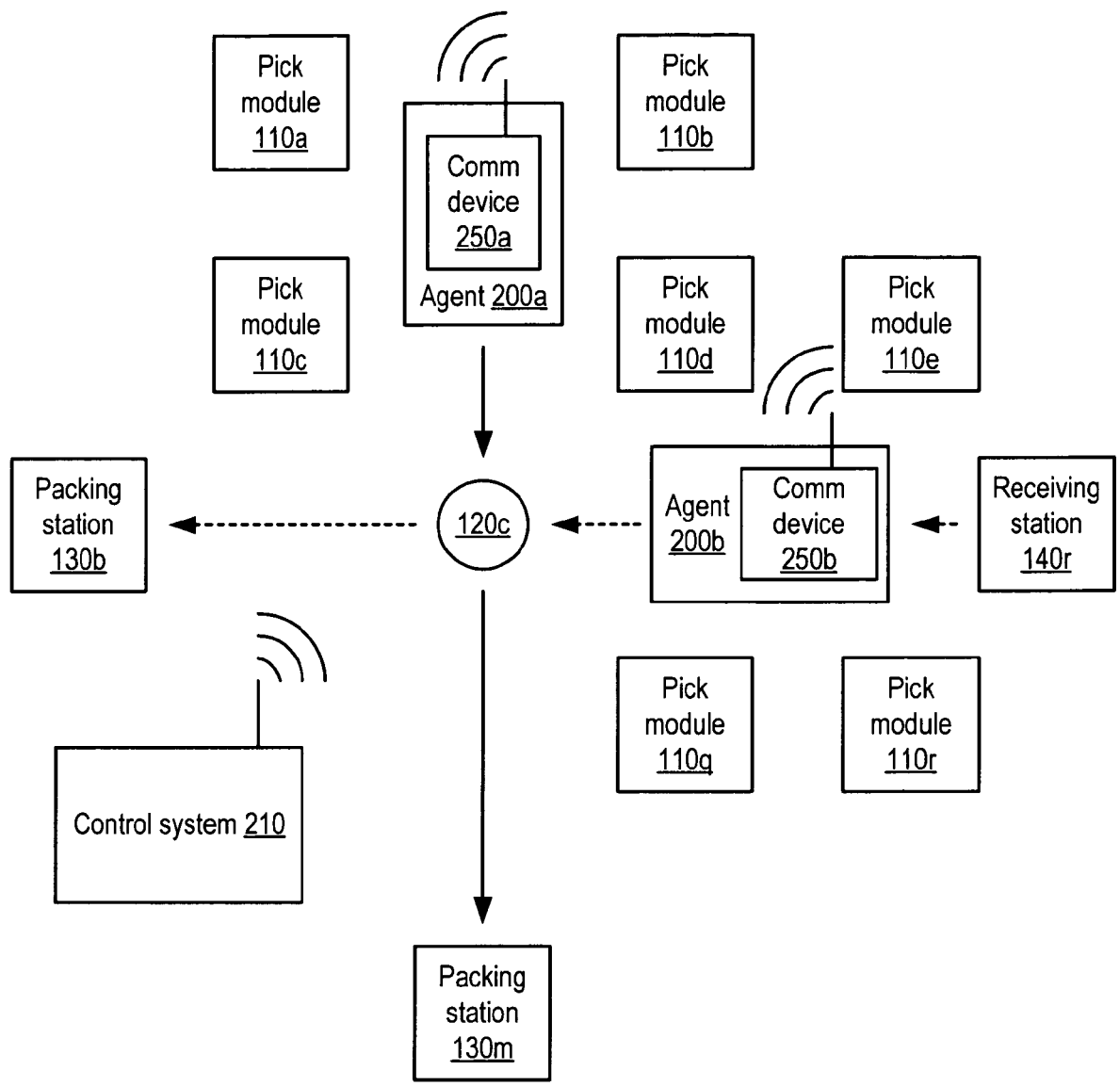
FIG. 4A is a block diagram illustrating exemplary paths of several agents through a portion of a fulfillment center.

A detailed example of item exchange between agents 200 is illustrated in FIG. 4. In FIG. 4, a portion of fulfillment center 100 is shown, with some elements omitted for clarity.

In the illustrated embodiments, two agents 200a-b are illustrated traveling along respective paths through fulfillment center 100. Each of agents 200a-b has an associated communication device 250a-b, which may be configured as described above in conjunction with the description of FIG. 2. In particular, communication devices 250 may be configured to communicate with control system 210, for example via radio communication, wireless networking, or a wired communication protocol. Control system 210 may be configured to convey instructions to agents 200 as described above (e.g., regarding specific items 325 to pick, specific pick modules 110 to visit, etc.).

In the illustrated embodiment, agent 200a may receive instructions from control system 210 to pick one or more items 325 from one or more pick modules 110 in its general vicinity (e.g., pick modules 110a-d). Some of the items 325 that agent 200a picks may be destined for a different packing station 130 than, others. For example, in one embodiment, packing station 130b may be configured to automatically package single CD or DVD items, while packing station 130m may be configured to handle bulkier items or multi-item orders. Additionally, some of the items 325 that agent 200a picks may correspond to multiple-item orders, though agent 200a may not be instructed to pick every item in a multiple-item order. In a manner similar to agent 200a, agent 200b may receive instructions from control system 210 to retrieve one or more items 325 from receiving station 140r to be restocked into various pick modules 110, such as pick modules 110d, e, q, r. Agent 200b may also receive instructions to pick other items 325 from nearby pick modules 110 and to convey those items 325 to packing station 130m, and agent 200a may also receive instructions to retrieve other items 325 for restocking.

In the illustrated embodiment, the paths of agents 200a-b may intersect at exchange station 120c. In various embodiments, exchange stations 120 may include one or more storage bins similar to totes 310, or may include a table, platform, or simply a marked-off area of floor space. In some embodiments, an apparatus similar to or identical to that used to implement a pick station 110 may be deployed and designated as an exchange station 120. In other embodiments, an exchange station 120 may include a push cart 320 that is left in a fixed position instead of being maneuvered through fulfillment center 100. Additionally, in some embodiments, exchange stations 120 may include active electronics that may detect the presence of various items 325, such as may be implemented by some embodiments of motes 400 as described above (e.g., through proximity detection, RFID scanning, etc.). Although in FIG. 1 and FIG. 4, exchange stations 120 are illustrated as being located at the intersections of aisles within fulfillment center 100, in other embodiments exchange stations 120 may be located within aisles or at any other suitable location. Further, it is contemplated that in different embodiments of fulfillment center 100 or in different areas of the same fulfillment center 100, exchange stations 120 may be distributed with varying densities (e.g., one exchange station per 4 or 8 pick modules 110, etc.).

Rather than convey each of its picked items 325 to both packing stations 130b and 130m, in the illustrated embodiment agent 200a may be configured to exchange those picked items 325 destined for packing station 130b with agent 200b via exchange station 120c. For example, in one embodiment, agent 200a may receive an instruction via communications device 250a to deposit a particular item or items 325 at exchange station 120c as it proceeds along a path to packing station 130m. When agent 200a reaches exchange station 120c, it may variously deposit the particular item 325 by removing it from its corresponding tote 310 or by depositing tote 310 itself. In some embodiments, agent 200*a* may notify control system 210 that the deposit has occurred, for example by entering or scanning an item code 351 or a tote code 350 via communication device 250*a* at the time of deposit, while in other embodiments the deposit may be detected by sensors at exchange station 120*c*. In some embodiments, agent 200*a* may be instructed to perform the exchange by picking up an empty tote 310 from exchange station 120*c* after depositing its own tote 310, while in other embodiments, agent 200*a* may be instructed to exchange its tote 310 for a tote 310 containing item(s) 325 left by agent 200*b* or another agent 200.

While agent 200*a* receives instructions to deposit particular items 325 or totes 310 at exchange station 120*c* in exchange for other items 325 or totes 310, agent 200*b* may receive instructions from control system 210 to retrieve those deposited items 325 from exchange station 120*c* in exchange for its own items 325 or totes 310. Agent 200*b* may further receive instructions to convey the items 325 it retrieves to, for example, packing station 130*b*, or to another exchange station 120 to be exchanged with another agent 200. In some embodiments, agent 200*b* may be instructed to retrieve deposited items 325 only after agent 200*a* actually deposits them. In other embodiments, control system 210 may estimate the trajectories of agents 200*a-b* to predict when items 325 may be deposited by agent 200*a* and when agent 200*b* may arrive at exchange station 120*c*, and may instruct agent 200*b* based on such predictions rather than make such instruction dependent on agent 200*a* having actually deposited those items 325. Similarly to agent 200*a*, in various embodiments, agent 200*b* may retrieve a particular item 325 from exchange station 120*c* and place it in a corresponding tote 310, or may retrieve a tote 310 or exchange a tote 310 on its push cart 320 for a tote 310 located at exchange station 120*c*. Agent 200*b* may also acknowledge retrieval of a particular item 325 or tote 310 by entering or scanning an item code 351 or tote code 350 via communication device 250*b* at the time of retrieval. Alternatively, retrieval may be detected and acknowledged by sensors within totes 310 or push cart 320. In addition to retrieving items 325 from exchange station 120*c*, agent 200*b* may also receive instructions to deposit other items 325 at exchange station 120*c* to be retrieved by other agents 200.

Thus, in the illustrated embodiment, agent 200*a* may be configured to pick items 325 destined for multiple different destinations, but may not be required to travel to each destination. Instead, as part of an exchange operation, agent 200*a* may deposit picked items 325 at exchange stations 120 to be retrieved and conveyed to other destinations by other agents 200. Additionally, agent 200*a* may retrieve from exchange stations 120 various items 325 that it did not originally pick, but which are destined for a destination on agent 200*a*'s path. By planning the paths of agents 200 in addition to planning exchanges at various exchange stations 120, control system 210 may be able to maximize the time a given agent 200 spends picking items and reduce the cost (in time and effort) required to convey a picked item to its destination.

It is noted that in some embodiments, items 350 or totes 310 need not be exchanged solely at exchange stations 120. For example, in some embodiments, if two agents 200 encounter each other at any point within fulfillment center 100 (as detected or directed, e.g., by control system 210 or by the communication devices 250 of the agents 200), those agents 200 may be instructed to exchange certain items 350 or totes 310, regardless of whether they are at an exchange station 120. However, it is noted that in some embodiments, exchange stations 120 may allow the deposit and retrieval components of an exchange to be separated over a period of time, which may allow for greater flexibility in scheduling exchanges and determining paths for agents 200. In some embodiments, item or tote exchange may occur both at exchange stations 120 and directly between agents 200, which may provide a maximum degree of flexibility in planning exchanges. Additionally, it is noted that once an item 325 is picked, it need not necessarily be ultimately delivered to a packing station 130. For example, if an order specifying a particular item 325 is cancelled while that item 325 is en route to a packing station 130, the particular item 325 may be rerouted back to a pick module 110 to be restocked.

In some embodiments, it is noted that fixed exchange stations 120 may be omitted entirely from fulfillment center 100, and that any exchanges that occur may transpire directly between two or more agents 200 who encounter one another. As described in greater detail below, such exchanges may be globally and deterministically planned, or may occur opportunistically based on encounters that happen to occur as agents 200 follow their respective paths. In such embodiments, the locations at which exchanges occur may be understood to be functions of the paths of the agents 200 participating in the exchange, rather than functions of static or predefined exchange locations. That is, in such embodiments, exchange locations may be regarded as dynamic, virtual entities that arise when exchanges are needed, rather than fixed, tangible locations or stations.

Figure 4B:
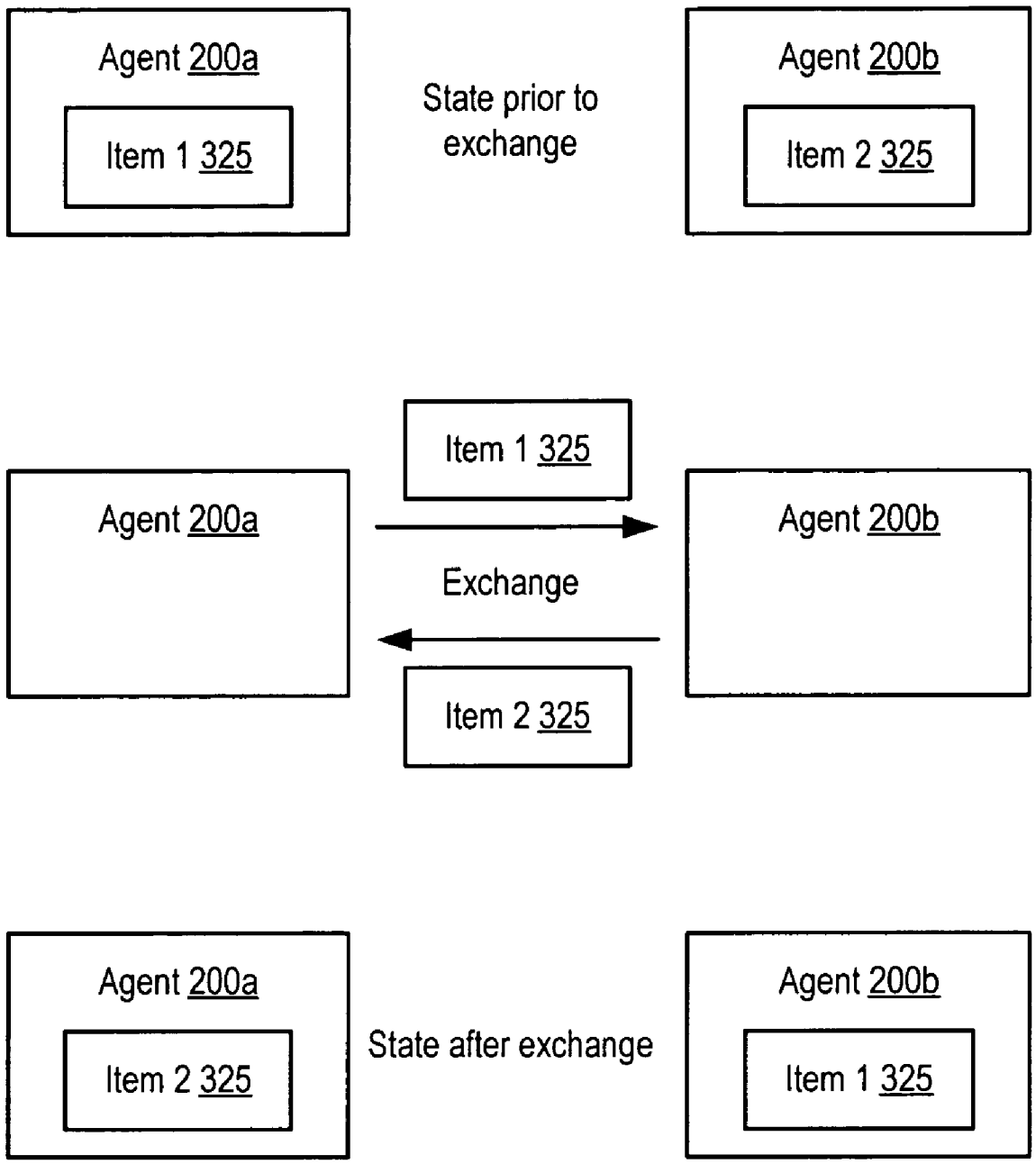
FIG. 4B is a block diagram illustrating one embodiment of an exchange of items among agents.

One embodiment of an exchange of items 325 between two agents 200 is illustrated in FIG. 4B. In the illustrated embodiment, prior to a transfer occurring, a first agent 200*a* has in its possession a first item denoted item 1 325. Similarly, prior to a transfer occurring, a second agent 200*b* has in its possession a second item denoted item 2 325. For purposes of illustration, an item 325 in the possession of an agent 200 is illustrated in FIG. 4B as located within that agent 200. However, it is understood that such an item 325 may be located within another container or vehicle associated with and under the control of agent 200, such as totes 310 and/or push carts 320 as described above.

In the illustrated embodiment, the exchange is effected by transferring item 1 325 from agent 200*a* to agent 200*b*, and similarly transferring item 2 325 from agent 200*b* to agent 200*a*, such that following the exchange, item 2 325 is in the possession of agent 200*a* and item 1 is in the possession of agent 200*b*. In some embodiments, the depicted exchange may be performed directly by agents 200*a-b*, for example in the event that agents 200*a-b* encounter each other within fulfillment center 100. In other embodiments, the depicted exchange may occur indirectly via an exchange station 120. During indirect exchanges, the transfers of the items 325 involved in the exchange may occur at separate times rather than concurrently, as may be the case in direct agent-to-agent exchanges.

It is also contemplated that multiple-way exchanges may occur among multiple agents 200. For example, in a multiple-way exchange, a first agent 200 may transfer an item 325 to a second agent 200. However, rather than receiving an item in return from the second agent 200, the first agent 200 may instead receive an item from a third agent 200. In some embodiments, use of exchange stations 120 may facilitate multiple-way exchanges among agents 200 by decoupling the transfers of items 325 involved in making exchanges.

In some embodiments of fulfillment center 100, numerous agents 200 may concurrently travel along respective paths through fulfillment center 100, each selecting various items 325 from pick modules 110, conveying certain selected items 325 to packing stations 130, and exchanging other selected items 325 with other agents 200. It is noted that in some embodiments, the process of restocking items 325 to pick modules 110 may be carried out as the rough inverse of the picking process, with agents 200 retrieving items 325 to be restocked from receiving stations 140, conveying some of those items to particular pick modules 110, and exchanging others of those items with other agents 200. In some embodiments, agents may be both picking and restocking as they traverse their respective paths, as instructed by the control system via communication devices 250.

A given agent 200 in one embodiment may concurrently function in multiple roles with respect to different items 325 or totes 310 on push cart 320. For example, at any given time, an agent 200 may have picked certain items 325 on push cart 320, while that agent 200 may have acquired other items 325 through exchanges with other agents 200. That is, an agent 200 may be a picker with respect to some items 325, but simply a conveyor or transporter (e.g., to a packing station 130, or to the next exchange station 120) with respect to other items 325. Further, that agent 200 may be a restocker with respect to still other items 325. In some embodiments, the ultimate destination of a given item 325 may be managed by control system 210 transparently to agents 200. That is, an individual agent 200 may receive instructions to pick, exchange or restock a given item 325 without knowing the instructions received by other agents 200 with respect to given item 325. Thus, the actions of multiple agents 200 may be coordinated to maximize the efficiency of both picking and restocking items 325. Further, by allowing agents 200 to function in multiple roles with respect to different items 325, dedicated groups of pickers and restockers may be unnecessary, which may increase the overall flexibility of managing workflow, for example by allowing any conveniently-positioned agent 200 to perform any relevant function with respect to items 325 rather than waiting for a particular functional type of agent 200 to reach a particular location to perform a needed picking, restocking or conveying action.

Although in some embodiments an agent 200 may function in multiple roles with respect to different items 325 as just described, in other embodiments designating certain roles to certain agents 200 may provide useful features within fulfillment center 100. For example, in one embodiment certain agents 200 may not pick any items 325 at all, but may instead simply retrieve items 325 from exchange stations 120 (or directly from other agents 200) and convey the retrieved items 325 to packing stations 130, to other exchange stations 120, or to other agents 200. That is, such an agent primarily may be directed to transport or convey items 325 rather than to pick or stow items. Such an agent may also be referred to as a "tote runner." Although tote runner agents 200 may decrease overall picking efficiency in terms of items picked per unit of distance traversed, a tote runner agent 200 may more quickly convey a given item 325 to its destination. In some embodiments, a tote runner agent 200 may be available to retrieve items 325 from each exchange station 120 it encounters along its path, if necessary, while in other embodiments a tote runner agent 200 may visit only certain exchange stations 120 (e.g., every Nth exchange station 120). In some embodiments, separation of tasks among agents 200 having different roles (e.g., picking vs. conveying) may improve productivity and simplify planning and coordination of agents 200. Such separation of tasks may also allow greater automation of simpler tasks. For example, in one embodiment tote runner agents 200 may be implemented as robots configured to perform the relatively simple task of conveying totes 310 or carts 320 from one location to another, while more sophisticated agents 200 (e.g., human agents) may be deployed to perform the more complex tasks of discriminating among items 325 to select and/or restock them with respect to pick modules 110.

It is contemplated that in some embodiments, tote runner agents 200 may also be directed to relocate empty totes 310 to various locations where totes are needed within fulfillment center 100, such as exchange stations 120, packing stations 130, receiving stations 140, or directly to one or more agents 200. For example, as items 310 are picked over time and conveyed to packing stations 130, empty totes 310 may gradually aggregate at packing stations 130. A tote runner agent 200 may redistribute such totes 310 to receiving stations 140 to be used for restocking inbound inventory, as well as to exchange stations 120 to be used by other agents 200 in picking other items 325. As noted above, relocation of empty totes 310 may also be performed in embodiments without tote runner agents 200, for example by coordinating exchanges of empty totes among agents 200 as they circulate through fulfillment center 100.

By instructing certain agents 200 to focus on tote running rather than item picking, it may be possible to convey an item 325 from a pick module 110 to a packing station 130 via one of several paths having differing latencies. For example, after being picked, an item 325 may follow a relatively indirect, longer-latency path, being exchanged with one or more different agents 200 on its way to a packing station 130. Alternatively, after being picked, that item 325 may be transferred a single time to a tote runner agent 200 and may follow a more direct, shorter-latency path to its packing station 130. Such a multiplicity of paths may allow overall picking efficiency to be traded off against expediency for certain items 325. For example, in one embodiment of fulfillment center 100, different classes of outbound shipping may be used (e.g., expedited shipping vs. ground shipping). In such an embodiment, the deadline for a given package to be at a particular outbound dock 150 may vary depending on its class of shipping. If a given item 325 is a high priority item (e.g., because its corresponding order specified expedited shipping), a shorter-latency path using a tote carrier agent 200 may be selected for the given item 325, in order to ensure that the given item 325 meets its shipping deadline. For less urgent orders, items 325 may take longer-latency, multiple-exchange paths that may be optimized for efficiency of agents 200 rather than time.

More generally, in some embodiments, providing multiple different types of paths and/or different roles of agents 200 may provide a number of different opportunities for conveying an item 325 from one point to another. In some embodiments, different paths or types of agents 200 may present different costs. For example, an expedited path in which an agent 200 conveys an item 325 to a destination directly or with minimal delay may present a higher cost than a path in which an agent 200 picks as many items 325 as possible, in that the former agent 200 may have a lower overall pick density than the latter agent 200. Other cost variations are possible and contemplated, such as costs correlated to the item-carrying capacity of an agent 200, costs of fixed versus opportunistic agent paths, etc.

In some embodiments, the particular path followed by an item 325 to a destination, including a particular combination of agents 200 and exchanges, may be determined according to a cost budget as well as any constraints associated with the item 325. For example, an item 325 that is to be picked and conveyed to a packing station 130 may be allocated a cost and/or a delivery deadline. In one embodiment, control system 210 may be configured to determine the lowest-cost path that satisfies the delivery deadline, or alternatively the minimum delivery delay that may be achieved for a fixed cost. In some embodiments, control system 210 may be configured to attempt to minimize both cost and delivery delay, while maximizing picking efficiency of agents 200. Control system 210 may also take other variables into account, as described in greater detail below.

Figure 5:
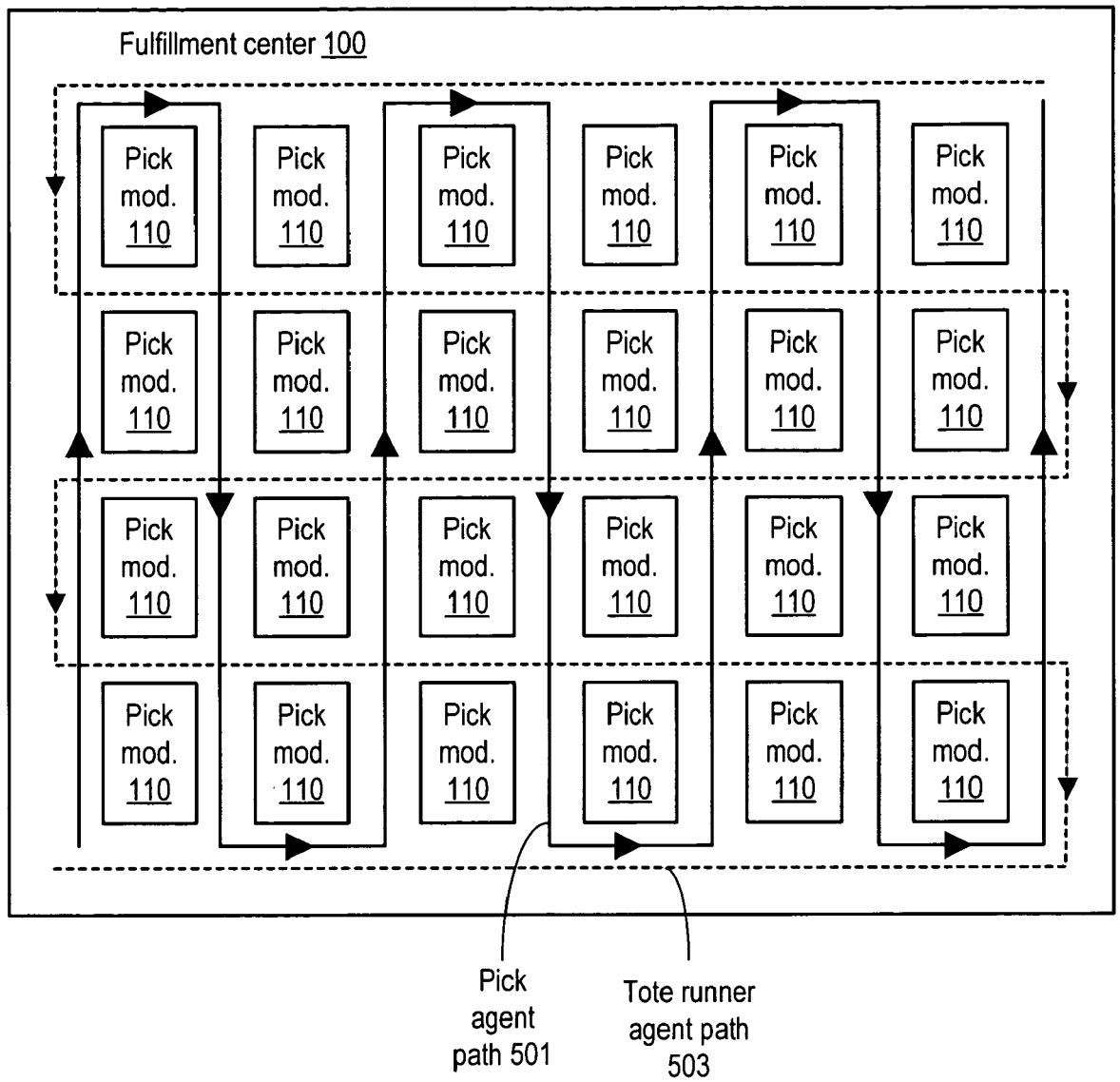
FIG. 5 is a block diagram illustrating an exemplary embodiment of agents performing different functional roles while traversing fixed paths through a fulfillment center.

One embodiment of a fulfillment center 100 in which agents 200 having different roles may follow different fixed paths through the fulfillment center 100 is illustrated in FIG. 5. In the illustrated embodiment, a number of pick modules 110 are shown within fulfillment center 100. Other elements, such as exchange stations 120, packing stations 130, and/or receiving stations 140 may be present as shown in FIG. 1, but have been omitted from FIG. 5 for clarity.

In the illustrated embodiment, two different paths are provided for two different types of agents 200 to follow. Specifically, some agents 200 may be designated as pick agents 200 (i.e., agents that may pick items from pick modules 110) and may follow pick agent path 501 through fulfillment center 100. (In some embodiments, pick agents 200 may also be instructed to restock items into pick modules 110 as described above.) Other agents 200 may be designated as tote runner agents 200 and may follow tote runner agent path 503 through fulfillment center 100. Pick agents 200 and tote runner agents 200 are not explicitly shown in FIG. 5. However, an arbitrary number of such agents 200 may circulate along the illustrated paths 501 and 503. In some embodiments, it is contemplated that agents 200 along both paths 501 and 503 may be pick agents.

It is noted that in the illustrated embodiment, paths 501 and 503 may be fixed paths. Thus, there may be very little complexity associated with planning the path a given agent 200 will take through fulfillment center 100. Instead, pick agents 200 may be instructed to pick items 325 opportunistically, on the basis of which pick agent 200 is closest to a particular pick module 110 from which to pick items 325, taking into account the fixed pick agent path 501. Item picking may thus be made more deterministic and therefore predictable.

However, at the same time, it is noted that pick agent path 501 and tote runner agent path 503 are roughly orthogonal in the illustrated embodiment. That is, paths 501 and 503 intersect frequently, thus providing numerous exchange opportunities for picked items 325. At the same time, paths 501 and 503 overlap minimally, which may provide maximal path coverage of fulfillment center 100 given the length of paths 501 and 503. Generally speaking, in a two-dimensional context, two paths may be roughly orthogonal to one another if they are roughly perpendicular to one another at the majority of points at which the paths coincide. In some embodiments, an exchange station 120 may be located at each intersection of paths 501 and 503, or at a certain number of the intersections. Alternatively, if a pick agent 200 and a tote runner agent 200 encounter each other at an intersection or where their paths coincide, a direct exchange between agents may occur. In some embodiments, agents 200 may not necessarily stop to perform an exchange at every opportunity, but may perform exchanges at less frequent intervals. For example, in one embodiment tote runner agents 200 may for exchanges at every other intersection, every third intersection, etc. In such an embodiment, less frequent exchanges may enable tote runner agents 200 to move more quickly across fulfillment center 100, improving overall latency of picking items 325 for orders.

The regular paths followed by each agent 200 through fulfillment center 100 may increase overall item picking efficiency by allowing pick agents 200 to pick those items 325 they are close to along their predictable paths. Although the paths followed by each agent 200 may be serpentine as shown in FIG. 5, the exchange opportunities presented by the intersecting paths may allow individual items 325 or totes 310 to move relatively short distances on their way from a receiving station 140, to another pick module 110 (e.g., for additional item picking), or to a packing station 130. For example, in some instances, properly planned exchanges among agents 200 may allow the distance and/or time traveled by totes 310 or items 325 to reach another pick module 110 or the periphery of fulfillment center 100 to approximate that of a single agent 200 carrying the items 325 directly to their destination. Thus, in some embodiments, agent exchange-based item picking with fixed agent paths may improve overall agent picking efficiency while preserving reasonable picking latencies for individual orders. However, it is noted that as described in greater detail below, in some embodiments agent paths may not be fixed, but may instead be dynamically determined based on variable factors such as order volume, types of items 325 specified in currently unfulfilled orders, the current positions of various agents 200, or other suitable factors that may vary over time.

It is noted that in embodiments where a given tote 310 corresponds to a specific order, an additional sort operation subsequent to item picking may be unnecessary. For example, one agent 200 may pick one or more items 325 corresponding to a specific order and place them in a particular tote 310. Subsequently, that agent 200 may exchange the particular tote 310 with another agent 200, who may pick additional items 325 corresponding to the specific order, may convey the particular tote 310 to a packing station 310, or may exchange the particular tote 310 with yet another agent 200. However, throughout this process, the particular tote 310 may remain associated with the specific order. By maintaining this association as items 325 are picked, items 325 may be effectively and dynamically sorted into orders by virtue of the picking process. In some embodiments, a single tote 310 may correspond to a given order, and the single tote 310 may, through exchanges among agents 200, traverse fulfillment center 100 as necessary until the given order has been completely picked. In other embodiments, multiple-item orders may correspond to multiple totes 310 that may be separately picked and subsequently combined, e.g., during an exchange or at a packing station 130. It is noted that combining items 325 from multiple totes 310 may generally constitute a considerably simpler process than sorting an aggregate of picked items into different orders. It is contemplated that in some embodiments, the picking and exchanging process as described above may allow items 325 to be sorted for corresponding orders without the use of a mechanical sorting device such as a Crisplant® sorter.

Figure 6:
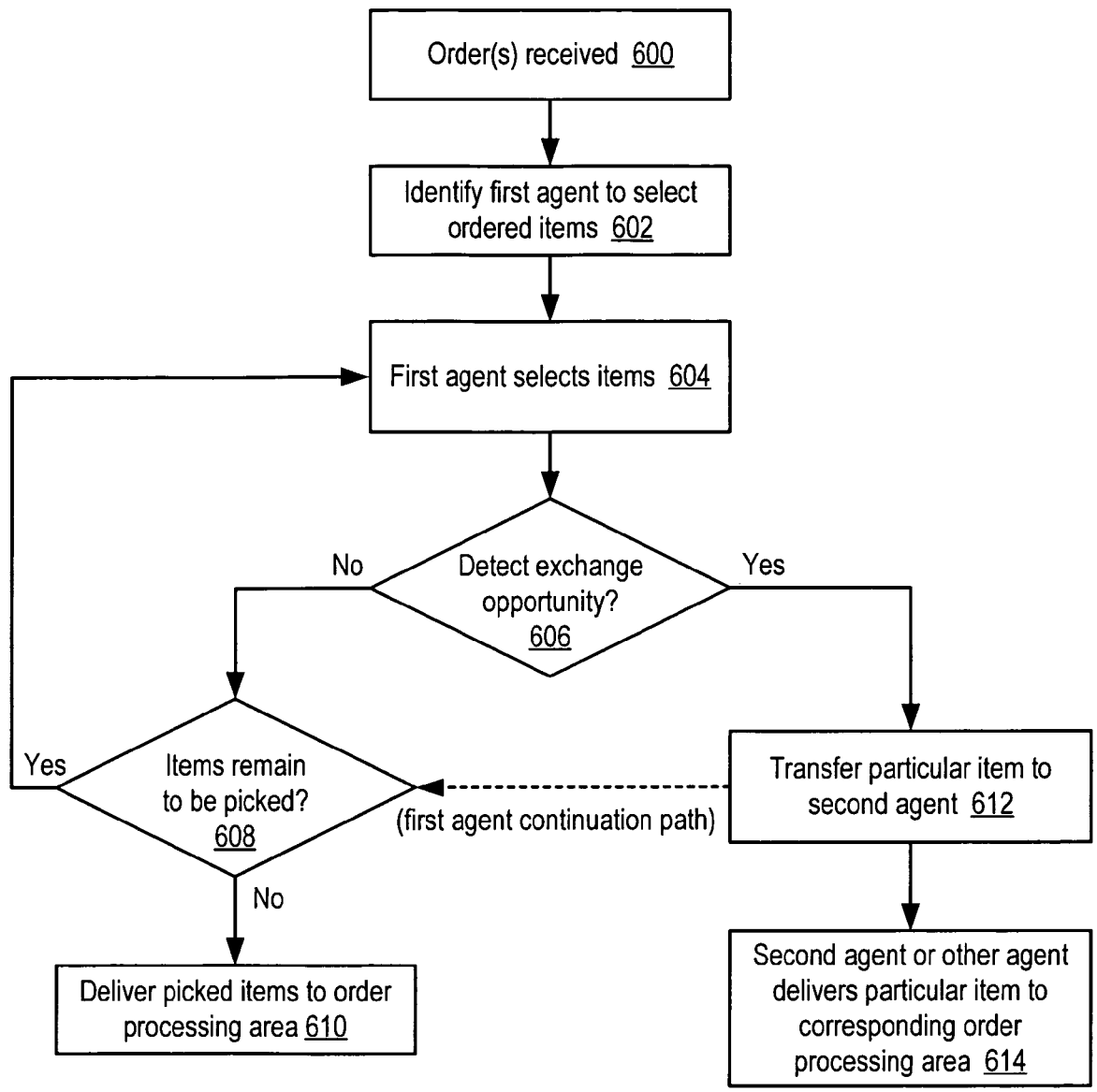
FIG. 6 is a flow diagram illustrating one embodiment of a method of picking items within a fulfillment center.
Figure 7:
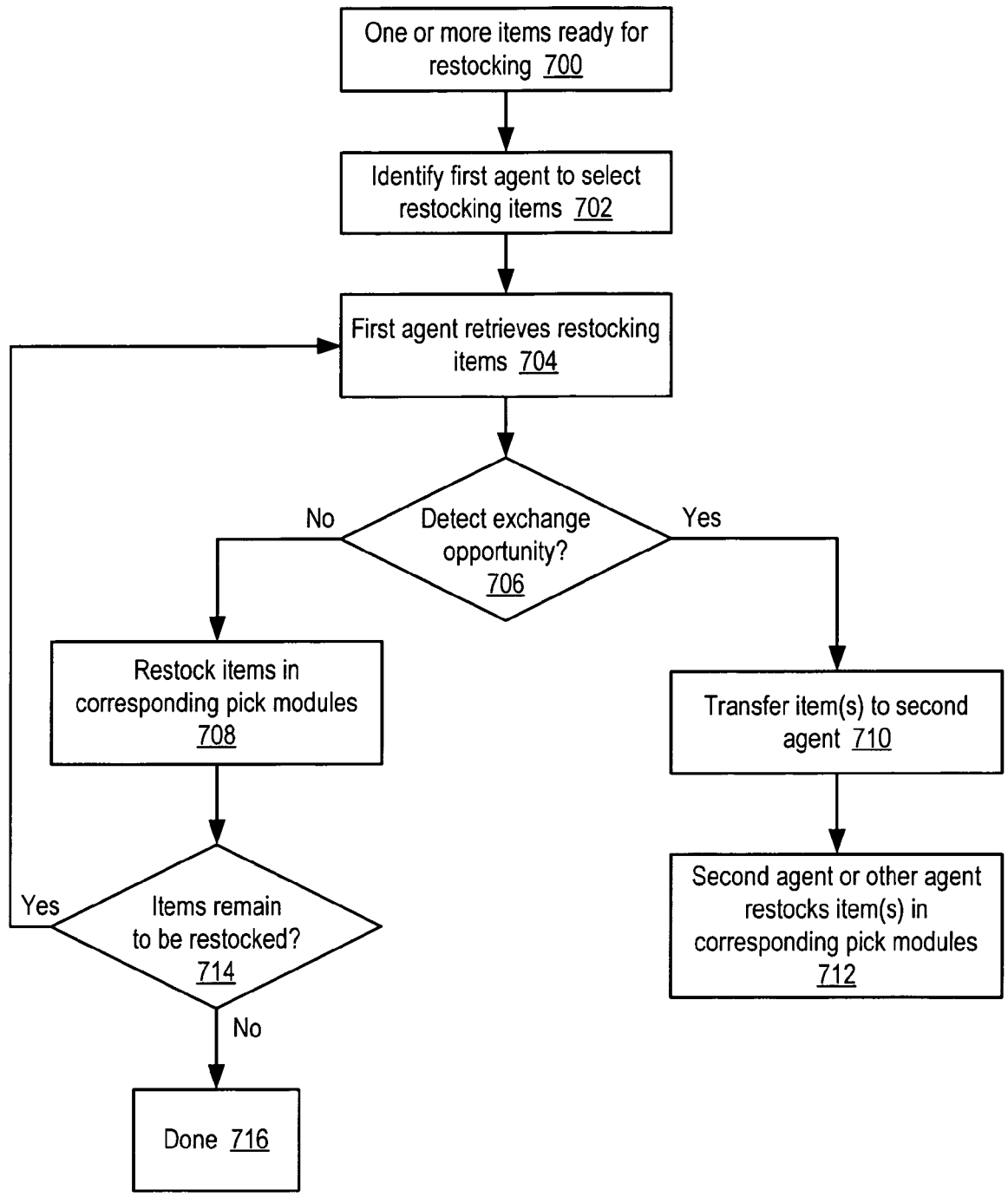
FIG. 7 is a flow diagram illustrating one embodiment of a method of restocking items within a fulfillment center.

Respective embodiments of general methods of item picking and item restocking in a fulfillment center are shown in FIGS. 6 and 7. Referring first to FIG. 6 collectively with FIGS. 1-5, operation begins in block 600 where an order specifying one or more items 325 is received. For example, in one embodiment orders may be received by control system 210 directly or indirectly from an electronic-commerce (e-commerce) portal, such as a web page, from an order database, or from other sources of order information. In some embodiments, multiple orders may be received and aggregated before proceeding to the next step. Also, in one embodiment, each ordered item 325 may be associated with a particular order processing area (e.g., a packing station 130), for example at the time an order is received. As noted previously, it is contemplated that in some embodiments, the order received may be an order to pick items in anticipation of a customer order. That is, items may be picked before a corresponding customer order has been placed.

Subsequently, a first agent 200 is identified to select a plurality of ordered items 325 (block 602). For example, control system 210 may determine that first agent 200 is in the vicinity of several pick modules 110, some of which store various ordered items 325, and may convey instructions (e.g., via communication device 250) to first agent 200 to pick those nearby items 325. The items 325 specified for selection may correspond to different orders. Subsequent to being identified to select a set of ordered items 325, first agent 200 selects those items, for example by placing them in totes 310 corresponding to particular orders (block 604).

After first agent 200 selects a particular item 325, an exchange opportunity for that particular item 325 may be detected (block 606). In one embodiment, control system 210 may determine that a particular item 325 should be transferred to a different agent 200, for example to expedite delivery of the particular item 325 to its corresponding order processing area (e.g., a packing station 130) via a tote runner agent 200 or other agent 200, or to reduce the overall distance first agent 200 traverses through fulfillment center 100. Control system 210 may also determine that the first agent 200 should receive item(s) 325 or tote(s) 310 from another agent 200. For example, control system 210 may determine that the first agent 200 should complete picking items 325 for an order already partially picked by another agent 200. Such types of exchange determinations in conjunction with proximity to another agent 200 or an exchange station 120 may constitute exchange opportunities.

In some embodiments, control system 210 may evaluate exchange opportunities in response to the movement of agents 200 within fulfillment center 100. For example, as first agent 200 approaches an exchange station 120 or another agent 200, control system 210 may evaluate whether exchange opportunities exist given the state of items 325 already picked by first agent 200, at exchange station 120, or with the other agent 200, taking into account other factors such as the ultimate order finalization areas for various items 325. In other embodiments, rather than detecting exchanges opportunistically, control system 210 may prescribe or plan exchanges. For example, control system 210 may instruct first agent 200 to proceed to a given exchange station 120 in anticipation of an exchange. Alternatively, in some embodiments first agent 200 may move along a fixed and predictable path as described above and illustrated in FIG. 5. In such embodiments, control system 210 may examine first agent 200's future path to plan for exchanges. It is contemplated that combinations of prescribed and opportunistic exchanges may also be employed.

If no exchange opportunity is detected, and if items 325 remain to be picked by first agent 200, picking continues (blocks 608-604). If no items 325 remain to be picked, first agent 200 delivers picked items 325 to an order processing area (block 610). In some embodiments, first agent 200 may not proceed directly to an order processing area, but may instead proceed along its path (e.g., a fixed path as shown in FIG. 5). If an exchange opportunity is subsequently detected before an order processing area is reached, first agent 200 may conduct the exchange at that time as described below.

If an exchange opportunity is detected for a particular item 325, first agent 200 exchanges the particular item 325 or a tote 310 containing the particular item 325 with a second agent 200 (block 612), for example either directly or by depositing the particular item 325 or tote 310 at an exchange station 120 for subsequent retrieval by second agent 200. Such an exchange may be either a unidirectional transfer in which first agent 200 receives, e.g., an empty tote 310 (or nothing at all), or a reciprocal exchange in which first agent 200 and second agent 200 both give and receive items or totes. Subsequent to the transfer, second agent 200 or another agent 200 delivers the particular item 325 to a corresponding order processing area (block 614). That is, in some instances subsequent exchanges of the particular item 325 may occur, for example if additional items are to be picked for the order including the particular item 325. In other instances second agent 200 may be directly on the way to an order processing area. For example, second agent 200 may be a tote runner agent as described above.

Also, subsequent to the exchange, first agent 200 may continue picking or proceed to another order processing area (e.g., first agent 200 may continue executing from block 608). As noted above, it is contemplated that in some embodiments, additional transfers of the particular item 325 may occur after its transfer to second agent 200. Consequently, neither first agent 200 nor second agent 200 need be the agent that ultimately delivers the particular item 325 to its corresponding order processing area.

Referring now to FIG. 7 collectively with FIGS. 1-5, operation of item restocking begins in block 700 where one or more items 325 are ready for restocking at a receiving station 140. For example, items 325 may arrive from external suppliers via inbound docks 160 and may subsequently be prepared for restocking, such as by unpacking and/or labeling them.

Subsequently, a first agent 200 is identified to select one or more items 325 ready for restocking (block 702). For example, control system 210 may determine that first agent 200 is in the vicinity of a receiving station 140 having inbound inventory items 325, and may convey instructions (e.g., via communication device 250) to first agent 200 to retrieve those nearby items 325. Subsequent to being identified to select a set of items 325 for restocking, first agent 200 retrieves those items, for example by placing them in one or more totes 310 (block 704).

After first agent 200 selects items 325 for restocking, an exchange opportunity for one or more of those items may be detected (block 706). Similar criteria may apply for detecting exchange opportunities during restocking as during item picking, described above. For example, in one embodiment control system 210 may seek to reduce the overall distance first agent 200 travels while maximizing the number of items 325 first agent 200 transports at a given time, and may consequently determine that it would be more efficient for first agent 200 to exchange some or all restocking items 325 with a different agent 200.

Also, in some embodiments, short-circuiting of inbound inventory to order picking may be supported. That is, in some embodiments first agent 200 may be instructed to exchange a particular restocking item 325 with another agent 200 seeking to pick that item 325, either directly via face-to-face exchange or indirectly via depositing the particular restocking item 325 at an exchange station 120 to be retrieved by the other agent 200. For example, in some circumstances it may be quicker or more efficient for the other agent 200 to retrieve an item 325 from restocking inventory rather than to pick that item 325 from a pick module 110. Also, in some embodiments, first agent 200 may be instructed to convey a particular restocking item 325 directly to a packing station 130 (similar to a tote runner agent 200 as described above), or to deposit the particular restocking item 325 at a nearby packing station 130 while en route to another location such as an exchange station 120 or a pick module 110. As described above, in various embodiments exchanges may be prescribed or performed opportunistically.

If no exchange opportunity is detected, first agent 200 proceeds to restock items 325 in one or more corresponding pick modules 110 (block 708). As in the item-picking case described above, in some embodiments first agent 200 may not immediately proceed to restock items 325 in pick modules 110, but may proceed along its path and may subsequently detect an exchange opportunity. If items 325 still remain to be restocked (block 714), operation may continue from block 704 with the retrieval of other items 325 for restocking. Otherwise, first agent 200 may be done with restocking (block 716) and may proceed to perform another task (e.g., picking, tote running, etc.).

If an exchange opportunity is detected for one or more restocking items 325, first agent 200 exchanges those items 325 with a second agent 200 (block 710), for example either directly or by depositing the particular item 325 at an exchange station 120 for subsequent retrieval by second agent 200. Subsequent to the transfer, second agent 200 or another agent 200 restocks those items 325 in a corresponding pick module 110 (block 712). In embodiments where short-circuiting of inbound inventory is supported as described above, second agent 200 may convey the transferred item(s) 325 along a pick path to a packing station 130 rather than along a restocking path to a pick module 110. It is contemplated that in some embodiments, some items 325 may be stored in multiple different pick modules 110 within fulfillment center 100. Consequently, in some instances, some restocking items 325 may be exchanged with other agents 200 for delivery to other regions of fulfillment center 100 while first agent 200 retains other restocking items 325 to restock locally.

As noted previously, a given agent 200 may be concurrently responsible for picking some items 325, restocking other items 325, and/or conveying still other items 325 towards packing stations 130 or pick modules 110. It is thus contemplated that in some embodiments, the methods illustrated in FIGS. 6 and 7 and described above may operate concurrently with respect to the same agent 200. Further, decisions as to whether to exchange items 325 or what specific path an agent 200 should take may depend on both picking operations and restocking operations.

It is noted that in some embodiments, the exchanging of items 325 among agents 200 need not be constrained to occur strictly within fulfillment center 100. For example, in some embodiments, exchanges among agents 200 may occur at any point along the supply chain for a given item 325, including prior to the given item's arrival at a fulfillment center 100, or subsequent to the given item's leaving a fulfillment center 100 en route to a customer or recipient (including along the "last mile" to a particular customer). In such embodiments, exchanges may occur, for example, between delivery trucks, aircraft, agents on foot, etc.

Broadly speaking, the exchange-based model of materials handling described in detail above may enable more efficient utilization of the picking and conveying capacity of a collection of agents 200. For example, in one embodiment a number of different agents 200 may follow respective paths through an inventory facility as previously described. For a given agent 200 that is already following a particular path, for example to fulfill its own instructions to pick or restock various items 325, there is relatively little incremental cost incurred by instructing the given agent 200 to exchange a particular item 325 with another agent 200 at a convenient point, such as a point where the agents 200 directly encounter one another or at an exchange station 120. That is, the given agent 200 need not deviate from its path, or even necessarily wait to synchronize with the other agent 200 to perform the exchange.

Improved capacity utilization may arise from item exchange, in some instances, by allowing agents 200 to handle items 325 they may not have originally picked. Referring to the above example, the given agent 200 may have a free tote 310 for which there exists no opportunity to pick an item 325 along given agent 200's current path. Correspondingly, another agent 200 may have opportunities to pick additional items 325, but no free totes 310 into which to pick those items 325. By conducting an exchange between these two agents 200, otherwise unutilized capacity of the given agent 200 may be used, while capacity freed by the other agent 200 may enable it to continue picking items 325 along its path. At the same time, neither agent 200 need deviate from its path in order to realize this exchange. That is, the exchange may effectively reduce the need to redirect agents 200 to maximize agent efficiency.

In some embodiments, agent-exchange based materials handling may be construed as a network of agents 200 in which individual agents 200 have particular tasks or roles to fulfill (e.g., picking, conveying and/or restocking items 325, as may be assigned in some embodiments by control system 210) as they follow respective paths through a materials handling facility. The network of agents 200 may operate cooperatively to carry out different types of jobs within the materials handling facility, such as picking all the items 325 for a particular customer order or restocking a pallet of incoming items 325, for example. However, a given job or order carried out with respect to items 325 may not be directly mapped to an individual agent 200, but rather mapped to a number of agents 200 who may conduct exchanges with one another in the course of carrying out the job. By the same token, an individual agent 200 may concurrently function in different roles or capacities with respect to many different jobs or orders.

The state of a network of agents 200 may vary over time depending on factors such as the number of agents 200 available to do work, the rate at which agents 200 complete their assigned tasks, the rate at which new jobs or orders occur and are mapped as tasks for various agents 200, or other factors. For example, in one embodiment, a network of agents 200 may begin working from an initial or reset state (such as, e.g., the beginning of a shift) in which no agents 200 may have yet picked or restocked items 325. As the state of the network evolves, agents 200 may acquire items 325 (e.g., through picking, exchanges, or retrieval for restocking) and may deposit acquired items 325 (e.g., through exchanges with other agents or delivery of items 325 to destinations). Depending on the inputs to the network and the behavior of the agents 200, the network may achieve a steady state in which the rate of movement of items 325 through the materials handling facility and/or the relative utilization of agents 200 (e.g., as indicated by pick density or utilization of cart 320) may remain relatively constant on average.

For some sets of input factors, such as a given number of agents 200 and a given order volume, a network of agents 200 may operate at a maximum capacity, such that the network cannot fulfill further demand without sacrificing one or more operating parameters (such as, e.g., timeliness of fulfillment). In such circumstances, network resources may be adjusted in response to changes in input conditions. For example, in response to an increase in order volume, additional agents 200 may be added to the network, existing agents 200 may be given larger carts 320, etc. Subsequently, the network may adjust to a new steady-state condition over time as the additional resources are utilized.

It is noted that in some embodiments, the cost of adding resources to a network of agents 200 may be incurred in fixed increments (e.g., the cost of adding an individual agent 200 to the network), although the utilization of added resources may occur in lesser increments or on a continuous rather than incremental basis. For example, adding an agent 200 to a network may effectively add a unit of capacity (e.g., the maximum number of items 325 the added agent may pick and/or convey) to the network for a fixed cost, but at any given time a varying amount of the added unit of capacity may actually be in use. (It is noted that resources may be incrementally removed in a manner similar to adding, with similar implications.) Adjusting network resources on an incremental basis may in some instances simplify management of the network of agents 200. For example, it may function to absorb or smooth variations in demand on the network, such that network resources may not constantly be adjusted in response to temporary or minor variations in incoming order volume or in agent task completion.

Exemplary Control System and Data Model Embodiments

In some embodiments, as described above, the actions of various agents 200 may be coordinated by control system 210. For example, agents 200 may act in response to, instructions received from control system 210 via communication devices 250. In various embodiments, control system 210 may be configured to take numerous variables into account when planning how to instruct agents 200. For example, in one embodiment control system 210 may be configured to attempt to maximize the overall pick density of agents 200 within fulfillment center 100, where the pick density may be measured in terms of the number of items 325 picked per unit of distance traveled per agent 200. Control system 210 may also be configured to optimize for other definitions of pick density, or other suitable metrics such as items 325 picked per unit of time, etc. Specifically, control system 210 may be configured to plan the paths and sequences of actions (e.g., item picking, restocking, and/or exchanging actions) each agent 200 should be instructed to undertake.

In planning paths and actions for agents 200, control system 210 may be configured to take into account incoming and outstanding customer orders, as well as any differences in order priority. For example, older unfulfilled orders or orders for which a customer has specified expedited fulfillment may be of a higher priority than other types of orders, and control system 210 may attempt to arrange picking for higher priority orders before lower priority orders. In planning future actions of agents 200 control system 210 may also be configured to take into account the current positions of agents 200, predicted future positions of agents 200, currently planned paths for agents 200, and/or possibilities for exchange opportunities (e.g., direct exchange or via exchange stations 120) that may exist for both already-picked items 325 and items 325 yet to be picked. In some embodiments, control system 210 may be configured to take similar variables into account with respect to items 325 to be restocked into pick modules 110.

As detailed above in conjunction with the description of FIG. 5, in some embodiments control system 210 may be configured to determine actions for agents 200 in the context of agents 200 following fixed paths within fulfillment center 100. That is, in such an embodiment control system 210 may be configured to determine whether a given agent 200 should pick, restock, or exchange an item 325, but may regard the given agent 200's path as a constant rather than a variable. However, in other embodiments, control system 210 may be configured to plan paths as well as actions for agents 200, dependent upon any of a number of variables as just described.

In one embodiment, control system 210 may be configured to statically plan paths and actions for one or more agents 200. That is, control system 210 may plan a certain number of moves and/or actions for a given agent(s) 200 and may not reevaluate the plan until the given agent(s) 200 has completed the specified actions. In other embodiments, paths and actions may be reevaluated more frequently or dynamically. For example, in one embodiment, after an agent 200 indicates (e.g., via a handheld scanner or other type of communication device 250) that it has completed a given pick, restock or exchange operation, control system 210 may reevaluate the plan for that agent 200 in view of the current state of the fulfillment center 100. Depending on the current state, the plan for that agent 200 may be adjusted. For example, a new high-priority order may have arrived since the last analysis. A given agent 200 may be close enough to the item(s) 325 specified in the high-priority order that control system 210 may instruct it to detour to pick those item(s) 325 before returning to its previous path. Alternatively, a customer order may be of sufficiently high priority that control system 210 may sacrifice optimizing pick density with respect to that order. For example, control system 210 may instruct an agent 200 to pick corresponding item(s) 325 and convey them to a packing station 130 along the most direct path, bypassing exchanges with other agents 200 if necessary.

It is noted that in some dynamic embodiments, control system 210 may be configured to plan exchanges and paths opportunistically in response to the current state of the entire fulfillment system, rather than statically in advance. That is, rather than creating a detailed plan of moves and actions for each agent 200, control system 210 may evaluate system state on a regular basis to determine whether opportunities for exchanges or other actions exist, taking into account new state information (e.g., changes in agent position, new orders, completed orders, etc.) that may have transpired since the last evaluation. Control system 210 may then determine particular actions that should be taken by agents 200 during the horizon of time until the next evaluation. By using a dynamic, opportunistic planning method, in some embodiments control system 210 may more robustly accommodate the many highly dynamic variables that may exist within a complex and rapidly changing fulfillment system. However, it is also contemplated that in some embodiments, control system 210 may globally plan detailed actions of agents 200 over time as mentioned above.

Figure 8:
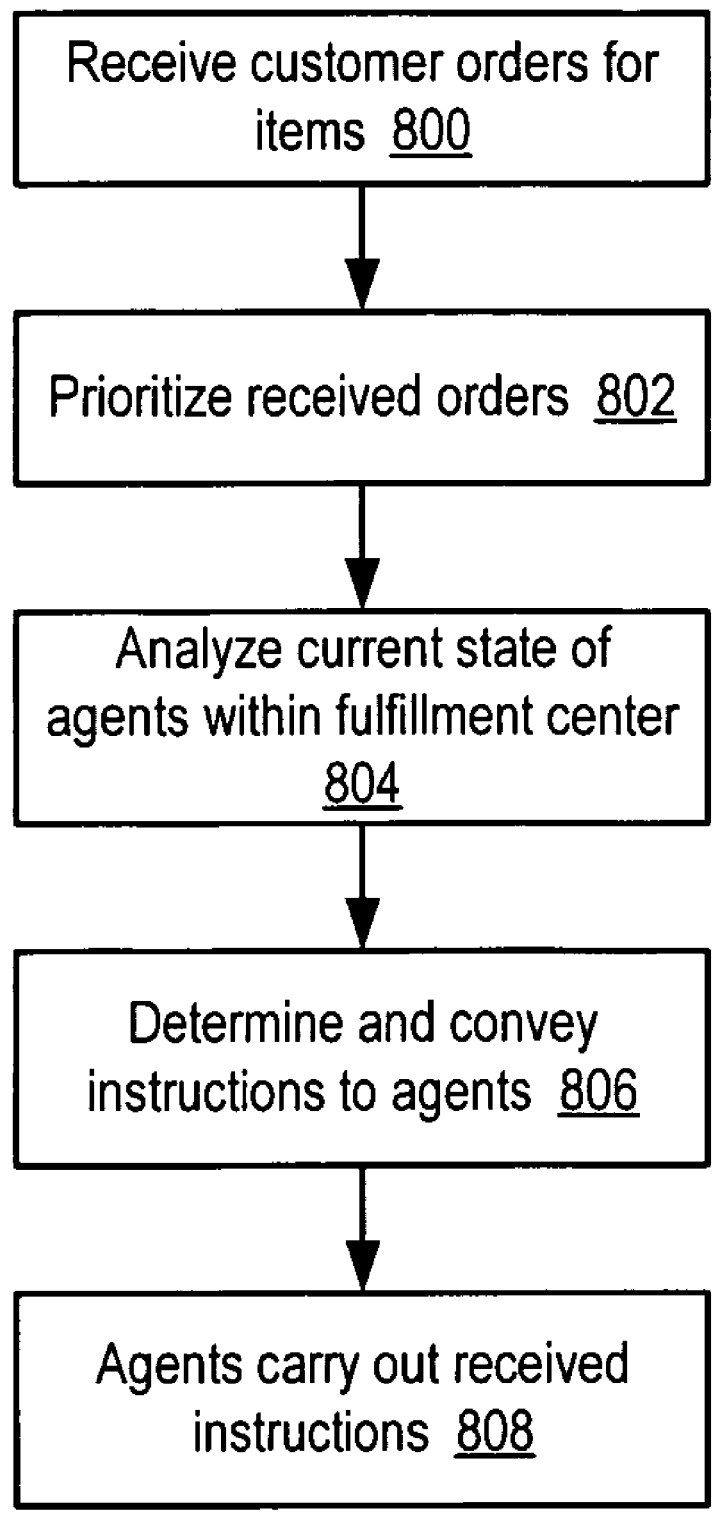
FIG. 8 is a flow diagram illustrating one embodiment of a method of planning actions for agents within a fulfillment center.

One embodiment of a method of planning actions for various agents 200 within a fulfillment center 100 is illustrated in FIG. 8. Referring collectively to FIGS. 1-8, operation begins in block 800 where customer orders for various items 325 are received. For example, in various embodiments control system 210 may receive orders directly from customers, or indirectly via another system such as an order processing system, an electronic commerce portal, etc. As noted previously, customer orders may include anticipated orders not yet actually placed by a customer.

Received orders are prioritized (block 802). For example, as described above, newly placed orders may have differing levels of priority based on factors such as customer requests, item availability. Further, in some embodiments some or all orders may increase in priority as they age. In some embodiments, control system 210 may separate orders into constituent items 325 specified by each order before or during prioritization. In some such embodiments, different items 325 in an order may have different corresponding priorities, for example if a customer requests that each item 325 in an order ship as soon as it is available.

The current state of agents 200 within fulfillment center 100 is also analyzed (block 804). In various embodiments, control system 210 may ascertain current locations of agents 200, proximity of agents 200 to exchange stations 120 and other elements of fulfillment center 100, or any other relevant information regarding the current operational state of fulfillment center 100.

Specific instructions are then determined for and conveyed (e.g., via communications device 250) to agents 200 (block 806). For example, a given agent 200 may be instructed to pick one or more items 325 from pick modules 110 dependent upon the analysis of the current state of the fulfillment center 100 in conjunction with order activity. Additionally, in some embodiments agents 200 may be instructed to exchange items 325 with other agents, to take certain items 325 to a packing station 130, or to select various items 325 for restocking from a receiving station 140.

Upon receiving instructions, agents 200 carry them out (block 808). As described above, in some embodiments agents 200 may acknowledge completion of a particular action or event, for example by scanning or entering an item code 351 or a tote code 350 in response to picking or restocking an item 325, depositing or retrieving an item 325 or a tote 310 from an exchange station 120, etc. In some such embodiments, control system 210 may use such acknowledgements to track progress of an agent 200 as well as the status of customer orders.

It is noted that in some embodiments, the steps illustrated in FIG. 8 may not be carried out strictly sequentially. In some embodiments control system 210 may be configured to concurrently execute some or all of the indicated steps with respect to different agents 200. For example, in one embodiment control system 210 may be configured to more or less continuously monitor and prioritize incoming order traffic, while independently managing each of agents 200. In such an embodiment, different agents 200 may receive instructions at different times. For example, when a given agent 200 completes and acknowledges a given task, control system 210 may dynamically determine what instruction to send the given agent 200 next, based on order state, agent state, and fulfillment center 100 state. In other embodiments, control system 210 may be configured to globally plan instructions for some or all of agents 200 concurrently, rather than individually.

In some embodiments, control system 210 may employ a computational data model configured to abstractly represent the state of items 325 within fulfillment center 100. In one embodiment, such as that illustrated in FIGS. 9A-B, an inventory data model may include a number of nodes 901 arranged in a hierarchical relationship with one another. Generally speaking, the relationship of nodes 901 within the data model may reflect some aspect of the relationship of physical objects within fulfillment center 100, such as the inclusion of items 325 within totes 310, the inclusion of totes 310 within carts 320, etc.

Figures 9A, 9B:
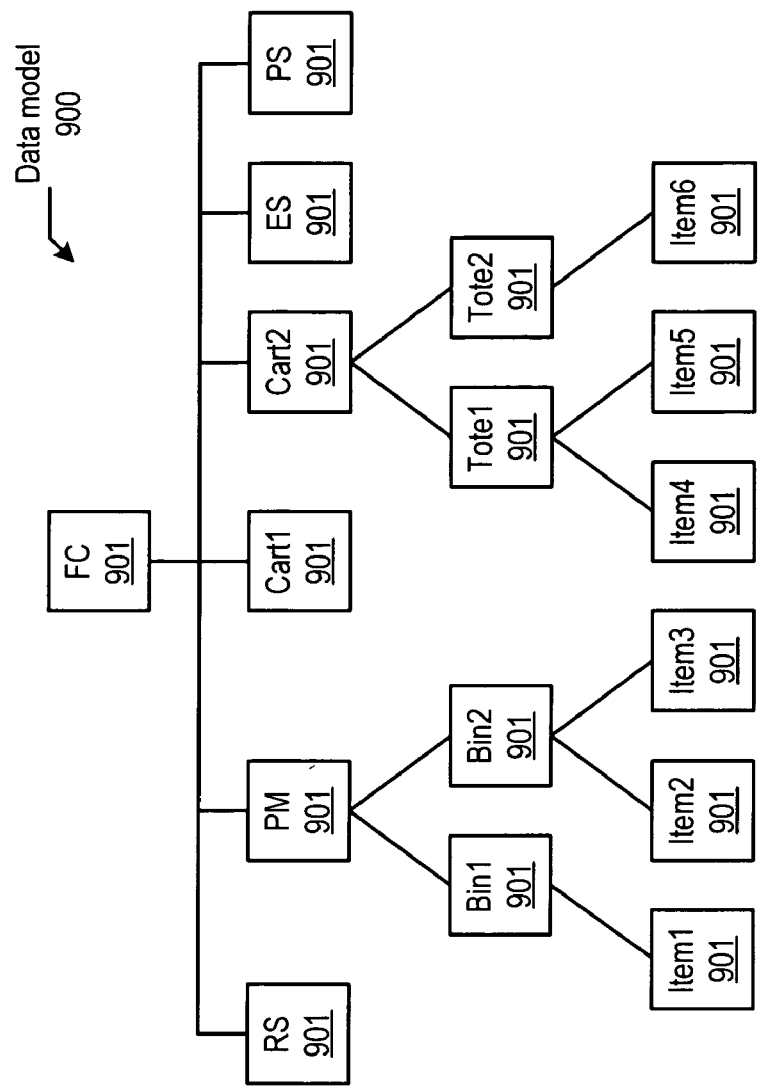
FIG. 9A is a block diagram illustrating one embodiment of a node of a data model.
FIG. 9B is a block diagram illustrating one embodiment of an inventory data model corresponding to a fulfillment center.

In the embodiment illustrated in FIG. 9A, a node 901 includes a number of attributes or fields. For example, node 901 may include an attribute indicating the general type of object within fulfillment center 100 that node 901 represents, such as an item 325, a cart 320, a pick module 110, fulfillment center 100 itself, etc. It is contemplated that in some embodiments, a data model may define a type of node 901 to represent any physical object that may have a relationship to an item 325, even for objects external to fulfillment center 100. That is, in some embodiments, a data model may include nodes 901 corresponding to suppliers, common carriers, customers or any other entity external to fulfillment center 100, down to an arbitrary level of granularity. For example, in one embodiment a data model may be configured to represent the state of items 325 from origination at a supplier to last-mile delivery to a customer.

Node 901 may include other pertinent attributes. For example, node 901 may include an identifier that uniquely identifies an instance of the node type. That is, a fulfillment center 100 may include numerous objects of a similar type, such as pick modules 110, each of which may be uniquely identified by a serial number, bar code or other suitable identifier that may be represented by the node identifier. A node 901 may include a status attribute that may indicate useful information about its corresponding object, such as whether it is empty, full, or partly full, in service/out of service, etc. Also, a node 901 may include a location attribute that may define the location of the corresponding object, for example in terms of grid or three-dimensional coordinates, latitude/longitude, etc. In some embodiments, a data model may be configured to represent a location explicitly as a container object having a corresponding node 901 rather than as a property of another object.

In various embodiments, nodes 901 may include other or different attributes than those just described. Also, in various embodiments it is contemplated that nodes 901 may be implemented using any suitable software techniques. For example, nodes 901 may be configured as records in a database or document, where node attributes are configured as fields of the record. Alternatively, nodes 901 may be implemented using object-oriented or other types of programming techniques.

An exemplary data model 900 corresponding to fulfillment center 100 is illustrated in FIG. 9B. For simplicity, only some of the possible nodes 901 are shown within data model 900; in various embodiments, it is contemplated that data model 900 may have many nodes and levels of hierarchy corresponding to the physical complexity of fulfillment center 100. Associative relationships among nodes 901 are illustrated in the depiction of data model 900 as connections between nodes 901. Generally speaking, an associated node 901 immediately above a particular node 901 may be referred to as the parent of the particular node 901, while any associated nodes 901 immediately below a particular node 901 may be referred to as children of particular node 901. A node 901 without a parent may also be referred to as a root node, and a node 901 without children may be referred to as a leaf node. Nodes 901 that have children may be referred to as container nodes 901 of their child nodes 901.

In the illustrated embodiment, the root node FC 901 may correspond to fulfillment center 100. Node FC 901 has child nodes RS 901, PM 901, Cart1 901, Cart2 901, ES 901 and PS 901. Respectively, these nodes may correspond to specific instances of receiving station 140, pick module 110, carts 320, exchange station 120 and packing station 130. As described previously, in some embodiments individual nodes 901 may be provided for each unique instance of an object within fulfillment center 100. Thus, in many embodiments, root node FC 901 may have substantially more child nodes 901 than are shown in FIG. 9B.

As described above, both pick modules 110 and carts 320 in some embodiments may include discrete containers or areas for storage of items 325. For example, a pick module 110 may include several different bins (not shown in FIG. 1) while a cart 320 may include several totes 310. Likewise, in some embodiments other objects such as receiving stations 140, packing stations 130, or exchange stations 120 may include discrete storage hierarchy. In the illustrated embodiment of data model 900, node PM 901 has two child nodes Bin1 901 and Bin2 901, which may correspond to bins of the particular pick module 110 to which node PM 901 corresponds. Similarly, node Cart2 901 includes two child nodes Tote1 901 and Tote2 901, which may correspond to totes 310 of the particular cart 320 to which node Cart2 901 corresponds. Bins and totes may contain a number of items 325, which are depicted in the illustrated embodiment as leaf nodes ItemN 901. Specifically, node Bin1 901 has a child node Item1 901. Node Bin2 901 has two child nodes Item2 901 and Item3 901. Node Tote1 901 also has two child nodes Item4 901 and Item5 901, while node Tote2 901 has one child node Item6 901.

It is noted that in some embodiments, data model 900 may encompass multiple fulfillment centers 100 as well as items 325 and other structure external to a given fulfillment center 100. In such embodiments, data model 900 may include nodes 901 both above and adjacent to node FC 901. That is, node FC 901 need not be the root node in some embodiments of data model 900. Additionally, data model 900 may in various embodiments employ more or fewer levels of node hierarchy than are shown, depending on the degree of granularity to which the structure of objects is modeled. For example, in some embodiments, although some objects like pick modules 110 may have finer-grained storage structure such as bins, data model 900 may be configured to model a particular pick module 110 as an aggregate of items without specifically modeling the fine structure of the particular pick module 110.

In some embodiments, control system 210 may be configured to model changes in the state of items 325 within fulfillment center 100 (e.g., due the actions of agents 200 in picking, transporting and restocking items 325) as operations on data model 900. Specifically, in one embodiment control system 210 may be configured to model state changes within fulfillment center 100 (or even external to fulfillment center 100, if data model 900 supports such external structure) as applications of a Virtual Fulfillment Machine (VFM) upon data model 900. In one embodiment, a VFM may include one or more operations representing the movement of a node 901 from a source container node 901 to a destination container node 901, which movement may abstractly represent the movement of corresponding objects within (or external to) fulfillment center 100. A simple VFM may operate on leaf nodes 901 corresponding to items 325 to represent the movement of items 325 from container to container, such as from a bin of a pick module 110 into a tote 310. However, as described below, VFMs may be sequenced or nested to model more complex movements, such as movements corresponding to container nodes 901 (e.g., movement of entire totes 310 during an exchange operation between agents 200).

Figure 10:
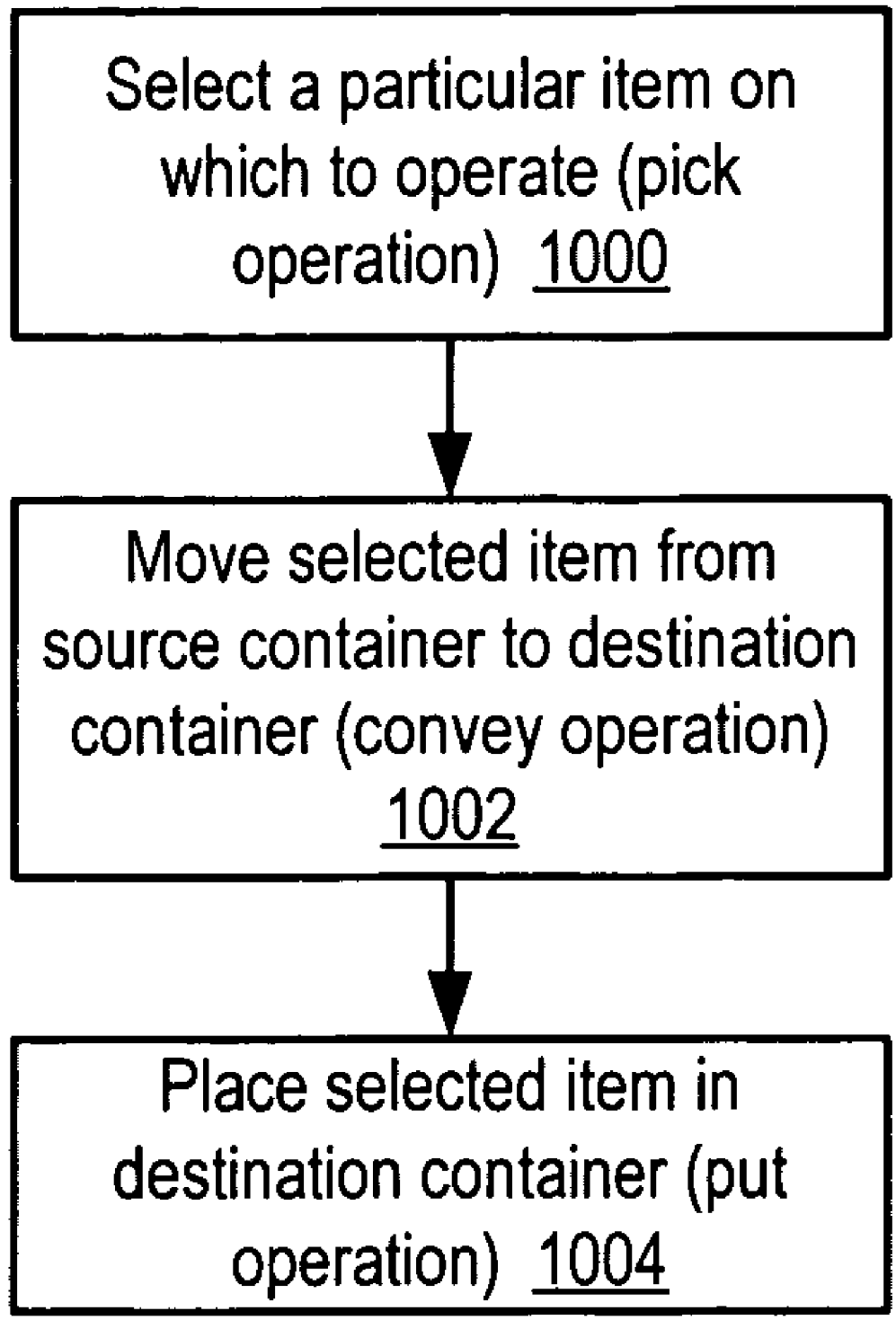
FIG. 10 is a flow diagram illustrating one embodiment of a method of operation of a virtual fulfillment machine.
Figure 11:
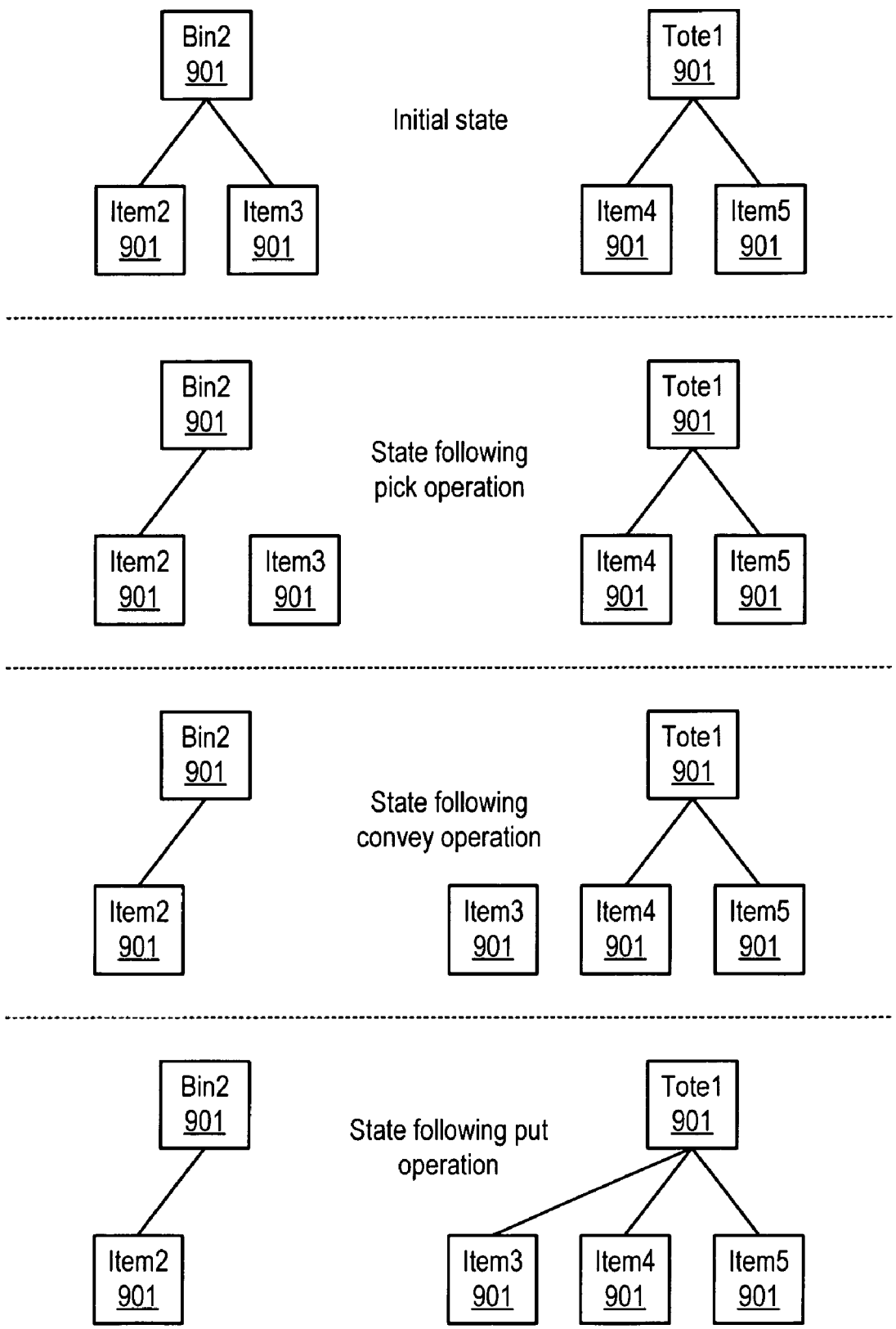
FIG. 11 is a block diagram illustrating one example of the evolution of state of a data model due to the application of a virtual fulfillment machine.

One embodiment of a method of operation of a VFM that illustrates the correlation of VFM operations to physical operations within fulfillment center 100 is illustrated in FIG. 10. One example of how data model 900 may evolve over time due to the operation of the VFM shown in FIG. 10 is illustrated in FIG. 11, which illustrates a portion of the embodiment of data model 900 shown in FIG. 9B. Both FIG. 10 and FIG. 11 will be described concurrently.

Before operation of the VFM commences, the initial state of data model 900 may be as reflected at the top of FIG. 11. That is, node Bin2 901 includes two child nodes Item2 901 and Item3 901, reflecting a corresponding container relationship between a bin of a pick module 110 and several items 325. Similarly, node Tote1 901 includes two child nodes Item4 901 and Item5 901, reflecting a corresponding container relationship between a tote 310 and several items 325.

An agent 200 may be instructed to move a particular item 325 corresponding to node Item3 901 from a pick module 110 corresponding to node Bin2 901 into a particular tote 310 corresponding to node Tote1 901 according to a VFM. In the embodiment of FIG. 10, the first step in the operation of a VFM is selection of a particular item 325 on which to operate, which may also be referred to as a pick operation of the VFM (block 1000). For example, the particular item 325 corresponding to node Item3 901 may be selected from among the various items 325 stored within a bin of a pick module 110. As shown in FIG. 11, in one embodiment the result of applying the VFM pick operation to node Item3 901 is to disassociate that node from its parent node Bin2 901. As a result, node Item3 901 becomes a root node.

Following the pick operation, the selected item 325 is physically moved from its source container to its destination container, which may also be referred to as a convey operation of the VFM (block 1002). For example, after selecting the particular item 325 from its corresponding bin of a pick module 110, an agent 200 may move the particular item 325 to a particular tote 310. In some embodiments, the result of a VFM convey operation on a node 901 within data model 900 may simply be to update the status of the node 901, for example to indicate that the corresponding item 325 is in transit. As shown in FIG. 11, following the convey operation node Item3 901 is still a root node. Although node Item3 901 is depicted as being closer to node Tote1 901 after the convey operation, mirroring the physical state of corresponding item 325, in some embodiments this change in proximity may not actually be reflected in the state of data model 900, or may be reflected as a general status indication associated with node Item3 901 as described above.

After the convey operation, the selected item is physically placed in its destination container, which may also be referred to as a put operation of the VFM (block 1004). For example, after moving the particular item 325 to a particular tote 310, an agent 200 may place the particular item 325 within that tote 310. As shown in FIG. 11, following the put operation the state of data model 900 is updated to reflect that node Item3 901 has become a child of node Tote1 901. That is, node Tote1 901 has become a container of node Item3 901, reflecting the new physical status of the corresponding item 325. Where there are many possible containers into which to put an item 325, the put VFM operation may also function as a sort operation, in that a particular container will be selected as a consequence of the put operation.

It is noted that in some embodiments, the exemplary state evolution of data model 900 as illustrated in FIG. 11 may be implemented in more or fewer steps than shown. For example, in some software implementations, moving a node 901 within data model 900 may be performed as a single, possibly atomic swap of pointers or other data structures, as opposed to multiple discrete software operations.

In some instances, not every pick, convey or put operation of a VFM may correspond to a physical change of state within fulfillment center 100. That is, in some instances, VFM operations may be virtual operations that may only affect the state of data model 900. For example, a VFM may correspond to an agent 200 moving a particular cart 320 to a particular pick module 110, e.g., in anticipation of picking or stowing items 325 within that pick module 110. Applying the steps of the method illustrated in FIG. 10, in one embodiment the pick operation of the VFM may correspond to agent 200 selecting the particular cart 320 while the convey operation may correspond to agent 200 physically moving the selected cart 320 to the destination pick module 110. Once the cart 320 is at the destination pick module 110, the physical move may be complete. Thus, in this instance, the put operation of the VFM may be a virtual put, and may involve changing the state of data model 900 to indicate the new physical relationship of cart 320 to the destination pick module 110. In other instances, it is contemplated that the convey or put VFM operations may be virtual operations.

Simple VFMs may form the basis for modeling and implementing more complex operations with or external to fulfillment center 100. Specifically, in some embodiments, one or more of the steps of a given VFM may themselves be modeled as VFMs. The resulting complex VFM may be referred to as a nested VFM. Additionally, multiple VFMs may be sequenced or chained together to model a series of operations, such as operations that may be performed by different agents 200. The following pseudocode illustrates one example of using nested and sequenced VFMs to model a series of agent operations. In the illustrated example, the VFM operations model a first agent 200 selecting an item 325 from a particular pick module 110, placing the selected item 325 in a tote 310, and transporting the tote 310 to an exchange station 120 where it is left for a second agent 200. The operations further model the second agent 200 retrieving the tote 310 from the exchange station 120, transporting it to a processing station such as a packing station 130, and leaving the item 325 at the processing station.

```
VFM1 tote from pickmod to exchange station
{
  a. pick: VFM2 pick item from pickmod into tote
  b. {
    1. pick: item from pickmod bin
    2. convey: item from bin to tote
    3. put: item in tote
  c. }
  d. convey: tote from pickmod to exchange station
  e. put: tote in exchange station
}
VFM3 tote from exchange station to processing station
{
  f. pick: tote from exchange station
  g. convey: tote from exch. station to processing station
  h. put: VFM4 put item from tote into processing station
  i. {
    1. pick: item from tote
    2. convey: item from tote to processing station
    3. put: item in processing station
  j. }
}
```

In the illustrated pseudocode, the first VFM (VFM1) models the move of a tote 310 from a pick module 110 to an exchange station 120. In this example, the actual selection of an item 325 to put in the tote 310 is modeled by implementing a nested VFM (VFM2) as the pick operation of VFM1. Once VFM2 selects item 325 and puts it in the tote 310, VFM1 models the transport of the tote 310 to the exchange station 120.

Subsequently, the third VFM (VFM3) models the move of the tote 310 from the exchange station 120 to a processing station such as packing station 130. Once the tote 310 has arrived at the destination processing station, a nested VFM (VFM4) models the transfer of the item 325 from the tote 310 to the processing station. In some embodiments, VFM1 and VFM2 may be performed by a first agent 200, while VFM3 and VFM4 may be performed by a second agent 200. Numerous other variations of nesting and sequencing VFMs are possible and contemplated. For example, rather than using nested VFM4 to model the transfer of item 325 from a tote 310 to a processing station, the tote 310 itself may be left at the processing station as the put operation of VFM3. Also, in some embodiments, additional levels of movement may be modeled by VFMs, such as the movement of carts 320 including totes 310, etc. It is contemplated that the operation of these and other configurations of VFMs may correspondingly alter the state of data model 900 in a manner similar to that described above with respect to FIGS. 10-11.

Generally speaking, a VFM may represent a series of actions that may be performed by an agent 200, which, as described above, may be a person, robot, machine or other autonomous entity capable of executing the operations of a VFM. An agent 200 configured to perform the actions of a VFM may also be referred to as a driver. The coordination of drivers executing VFMs may generally be performed by a controller. For example, in one embodiment, control system 210 may function as a controller that may receive orders such as customer orders, convert the orders into a set of VFMs, and assign the VFMs to particular drivers in order to carry out fulfillment.

In the course of transforming orders to VFMs and assigning VFMs to drivers, a controller may make use of both a scheduling algorithm and a process model. Generally speaking, a scheduling algorithm may be configured to assign work to agents 200 in a way that optimizes for one or more parameters, such as maximizing agent 200 efficiency (e.g., pick density), minimizing latency of picking a particular order, etc. A process model may generally define the resources available for implementing VFMs and the permissible ways of combining VFMs to realize a fulfillment operation. For example, the exchange model described above with respect to FIGS. 1-8 may be a particular process model that defines exchanges among agents 200 (either directly or via exchange stations 120) as permissible operations that may be employed in the scheduling and execution of VFMs. By contrast, a process model that does not support exchange operations may result in a different set of VFMs to implement fulfillment for a given set of orders. For example, the VFM pseudocode given above may be impermissible in a process model that does not support exchanges.

Exemplary Control System Hardware

It is contemplated that in some embodiments, any of the methods or techniques described above may be implemented as program instructions and data capable of being stored or conveyed via a computer-accessible medium. Such methods or techniques may include, for example and without limitation, the general functions of control system 210 in coordinating the paths of agents 200 through fulfillment center 100, determining what items 325 should be picked and/or restocked by various agents 200, determining where exchanges of items 325 among agents 200 should occur, and instructing agents 200 based on these determinations, as described above with respect to FIG. 1 through FIG. 8. More particularly, such methods or techniques may also include creation, maintenance and manipulation of a data model such as data model 900 as well as the definition, assembly and assignment of VFMs for execution as described above with respect to FIGS. 9A-B through FIG. 11.

Figure 12:
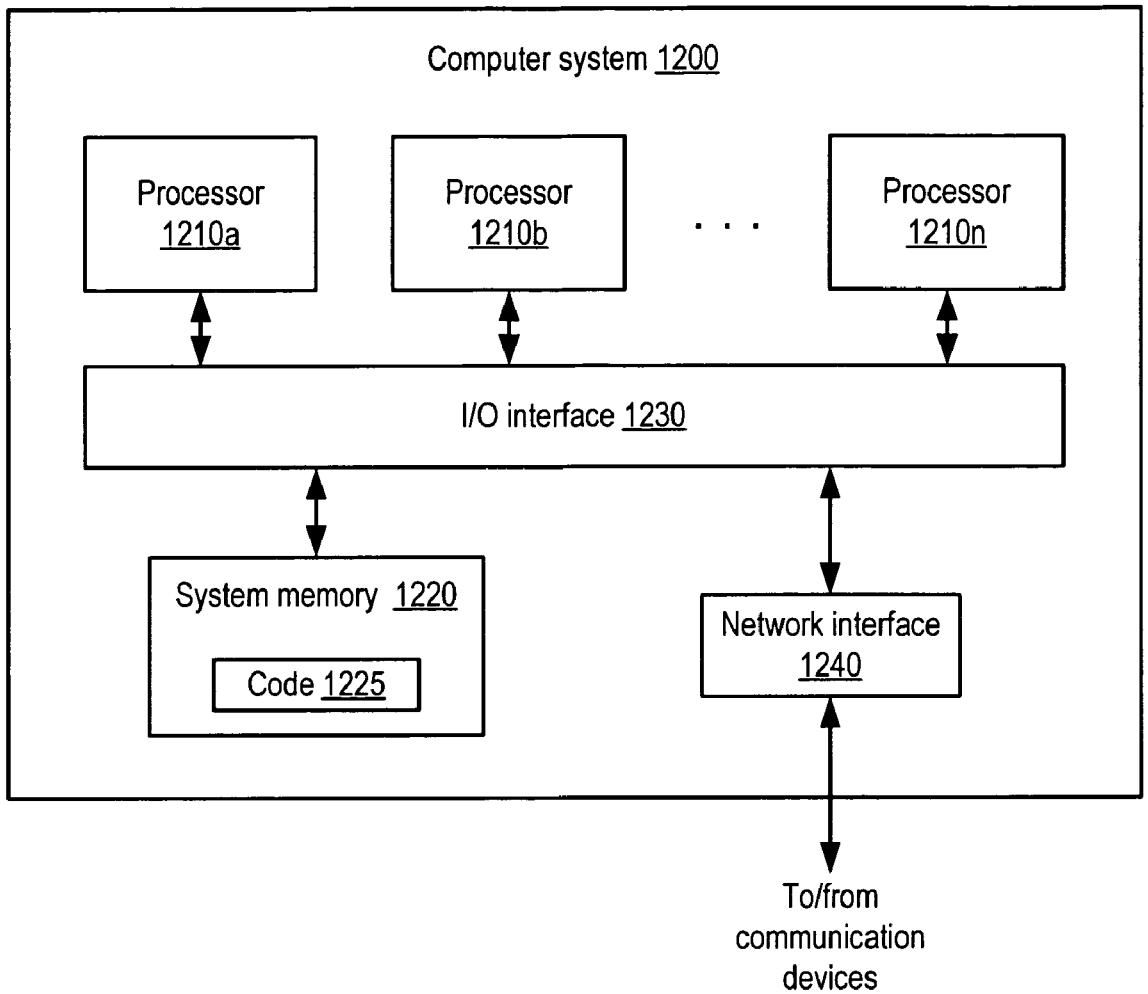
FIG. 12 is a block diagram illustrating an exemplary embodiment of a computer system.

Control system 210, in one embodiment, may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. In some embodiments, computer system 1200 may be illustrative of control system 210, while in other embodiments control system 210 may include elements in addition to computer system 1200.

In various embodiments computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by process 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above, are shown stored within system memory 1220 as code 1225.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, for example. In particular, network interface 1240 may be configured to allow communication between computer system 1200 and the various communication devices 250 described above. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1200 via I/O interface 1230. A computer-accessible medium may also include any volatile or non-volatile media such as RAM (e.g. SDRAM, DDR SDRAM, RDRAM, SRAM, etc.), ROM, etc, that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

In one embodiment, the relationship between control system 210 and communication devices 250 may be a server/client type of relationship. For example, control system 210 may be configured as a server computer system 1200 that may convey instructions to and receive acknowledgements from communication devices 250. In such an embodiment, communication devices 250 may be relatively simple or "thin" client devices. For example, communication devices 250 may be configured as dumb terminals with display, data entry and communications capabilities, but otherwise little computational functionality. However, it is contemplated that in some embodiments, communication devices 250 may be computer systems configured similarly to computer system 1200, including one or more processors 1210 and various other devices (though in some embodiments, a computer system 1200 implementing a communication device 250 may have somewhat different devices, or different classes of devices, compared to a computer system 1200 implementing control system 210). It is further contemplated that in some embodiments, the functionality of control system 210 may be distributed across some or all of communication devices 250. That is, in some embodiments, there may be no centralized point of control of the activity of agents 200; rather, communication devices 250 may function in a cooperative, distributed fashion to coordinate the activities of fulfillment center 100.

Figure 13:
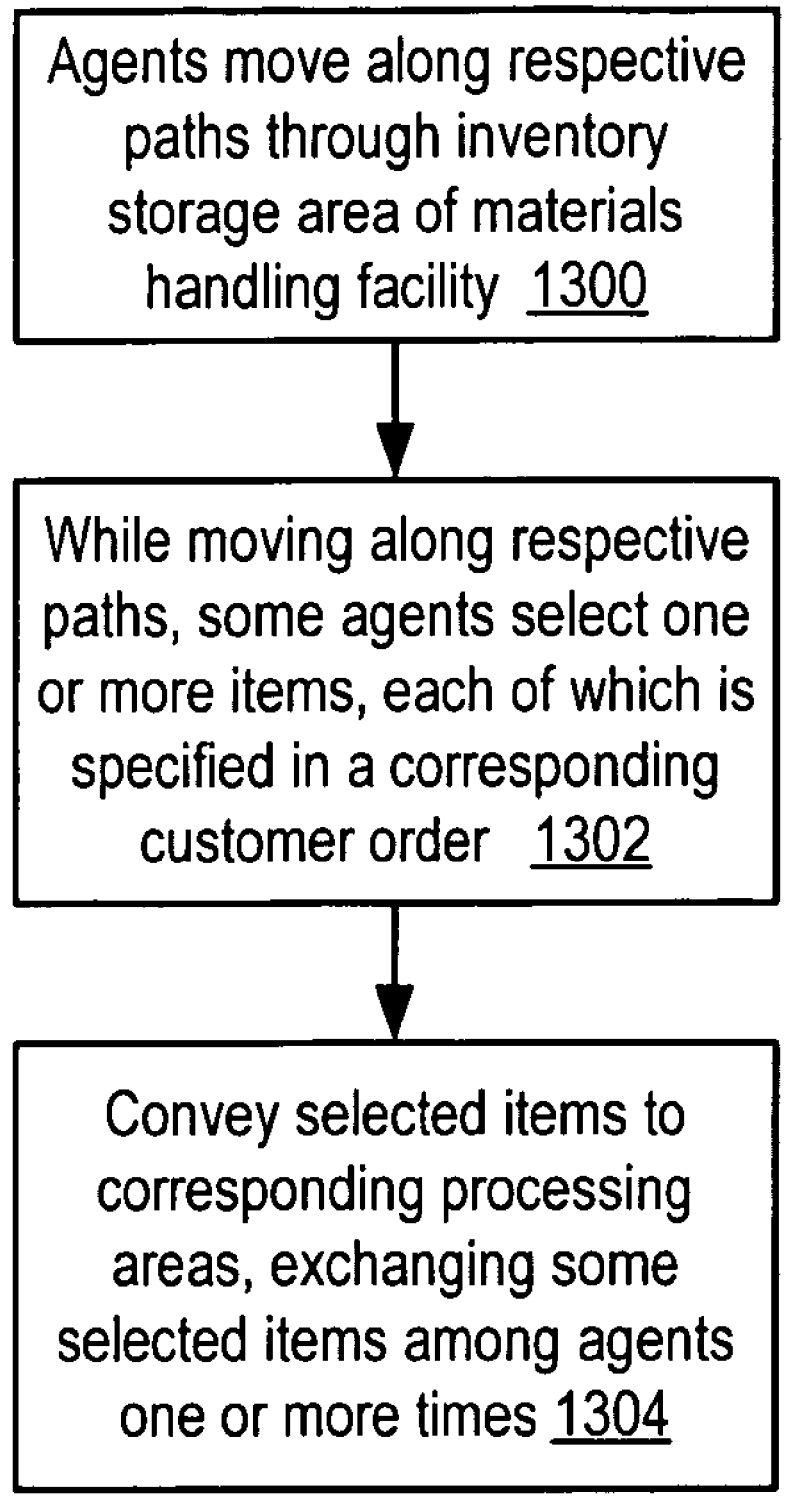
FIG. 13 is a flow diagram illustrating one embodiment of a method of agent-exchange based fulfillment of customer orders or requests for materials within a materials handling facility.

As noted previously, in some embodiments the methods and techniques described above may be implemented for an inventory storage area within any type of materials handling facility. To summarize, one exemplary embodiment of agent-exchange based fulfillment of customer orders or requests for materials within a materials handling facility is illustrated in FIG. 13. Referring collectively to FIGS. 1-13, operation begins in block 1300 in which a number of agents move along respective paths through an inventory storage area of a materials handling facility. For example, as shown above, in some embodiments agents 200 may move along respective paths through fulfillment center 100.

While moving along respective paths, some agents select one or more items stored within the inventory storage facility, where each selected item is specified in a corresponding customer order (block 1302). For example, in one embodiment agents 200 may pick items 325 from pick modules 110 in response to actual or anticipated customer orders, or any other type of materials request placed by a requestor as described above.

Selected items are then conveyed to corresponding processing areas, and in particular, some selected items are exchanged one or more times among the agents during the course of being conveyed to a corresponding processing area (block 1304). For example, in one embodiment items 325 may be exchanged directly among agents 200 or indirectly via exchange stations 120.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
sending, by a control system comprising one or more computers, instructions directing movement of a plurality of agents along respective paths within an inventory storage area;
sending, by the control system and while a first one of said plurality of agents is moving along a respective path, instructions for the first agent to select each of a plurality of items from said inventory storage area, wherein each of said plurality of items is specified in a corresponding customer order, wherein each of said plurality of items is designated to be delivered to a corresponding order processing area, and at least two of said plurality of items selected by the first agent are designated to be delivered to two different corresponding order processing areas by different ones of said agents;
sending, by the control system and subsequent to selecting a particular one of said plurality of items and prior to said particular item being delivered to any order processing area, an instruction for said first agent for transferring said particular item to a second one of said plurality of agents, wherein transferring said particular item comprises said first agent transferring physical possession of said particular item to said second agent, and wherein said transferring occurs during conveyance of said particular item to said corresponding order processing area;
sending, by the control system, an instruction for said second agent or another one of said plurality of agents to deliver said particular item to said corresponding order processing area.

2. The method as recited in claim 1, wherein selecting said particular item comprises placing said particular item into a container corresponding to said customer order.

3. The method as recited in claim 2, wherein transferring said particular item from said first agent to said second agent comprises said first agent exchanging said container including said particular item with said second agent.

4. The method as recited in claim 1, wherein transferring said particular item from said first agent to said second agent comprises said first agent depositing said particular item at an exchange station and said second agent subsequently retrieving said particular item from said exchange station.

5. The method as recited in claim 1, further comprising:
sending, by the control system and subsequent to the transfer of said particular item to said second agent, an instruction for said second agent to select a different item specified in a corresponding customer order from said inventory storage area.

6. The method as recited in claim 1, further comprising:
sending, by the control system and subsequent to the transfer of said particular item to said second agent, an instruction for said second agent to deliver said particular item to said corresponding order processing area, wherein said second agent does not select any other items from said inventory storage area prior to or subsequent to said transferring.

7. The method as recited in claim 1, further comprising:
sending, by the control system, instructions for said first agent to select one or more other items from an inventory receiving area, and, while moving along said respective path, for said first agent to restock said one or more other items within said inventory storage area.

8. The method as recited in claim 1, further comprising:
sending, by the control system, instructions for said first agent to select one or more other items from an inventory receiving area, and, subsequent to selecting said one or more other items, for said first agent to transfer said one or more other items to a third one of said plurality of agents; and
sending, by the control system, instructions for said third agent or another one of said plurality of agents to restock said one or more other items within said inventory storage area.

9. The method as recited in claim 1, wherein said first agent selecting said particular item from said inventory storage area comprises said first agent selecting said particular item from a pick module located within said inventory storage area.

10. The method as recited in claim 1, further comprising:
sending, by the control system, instructions for a third agent to retrieve said particular item from an inventory receiving area for restocking within said inventory storage area;
wherein said first agent selecting said particular item from said inventory storage area comprises said third agent transferring said particular item to said first agent.

11. The method as recited in claim 1, further comprising sending, by the control system, instructions for packaging said particular item for shipment subsequent to delivering said particular item to said corresponding order processing area.

12. The method as recited in claim 1, wherein said respective paths of said plurality of agents are dynamically determined in response to evaluating a current system state, wherein said current system state includes state information associated with said plurality of agents and said customer orders.

13. A computer-accessible storage medium storing program instructions, wherein the program instructions are computer-executable to:
instruct a first one of a plurality of agents to select each of a plurality of items from an inventory storage area, wherein each of said plurality of agents moves along a respective path within said inventory storage area, wherein each of said plurality of items is specified in a corresponding customer order, wherein each of said plurality of items is designated to be delivered to a corresponding order processing area, and wherein at least two of said plurality of items selected by the first agent are designated to be delivered to two different corresponding order processing areas by different ones of said agents;
subsequent to said first agent selecting a particular one of said plurality of items and prior to said particular item being delivered to any order processing area, instruct said first agent to transfer said particular item to a second one of said plurality of agents, wherein to instruct said first agent to transfer said particular item, the program instructions are further executable to instruct said first agent to transfer physical possession of said particular item to said second agent, such that transfer of said particular item occurs during conveyance of said particular item to said corresponding order processing area; and
instruct said second agent or another one of said plurality of agents to deliver said particular item to said corresponding order processing area.

14. The computer-accessible storage medium as recited in claim 13, wherein to instruct said first agent to select said particular item, the program instructions are further computer-executable to instruct said first agent to place said particular item into a container corresponding to said customer order.

15. The computer-accessible storage medium as recited in claim 14, wherein to instruct said first agent to transfer said particular item to said second agent, the program instructions are further computer-executable to instruct said first agent to exchange said container including said particular item with said second agent.

16. The computer-accessible storage medium as recited in claim 13, wherein to instruct said first agent to transfer said particular item to said second agent, the program instructions are further computer-executable to instruct said first agent to deposit said particular item at an exchange station and instructing said second agent to subsequently retrieve said particular item from said exchange station.

17. The computer-accessible storage medium as recited in claim 13, wherein the instructions are further computer-executable to:
subsequent to said first agent transferring said particular item to said second agent, instruct said second agent to select a different item specified in a corresponding customer order from said inventory storage area.

18. The computer-accessible storage medium as recited in claim 13, wherein the instructions are further computer-executable to:
subsequent to said first agent transferring said particular item to said second agent, instruct said second agent to deliver said particular item to said corresponding order processing area, wherein said second agent does not select any other items from said inventory storage area prior to or subsequent to said transferring.

19. The computer-accessible storage medium as recited in claim 13, wherein the instructions are further computer-executable to:
instruct said first agent to select one or more other items from a receiving area; and
while said first agent moves along said respective path, instruct said first agent to restock said one or more other items within said inventory storage area.

20. The computer-accessible storage medium as recited in claim 13, wherein the instructions are further computer-executable to:
instruct said first agent to select one or more other items from a receiving area;
subsequent to said first agent selecting said one or more other items, instruct said first agent to transfer said one or more other items to a third one of said plurality of agents; and
instruct said third agent or another one of said plurality of agents to restock said one or more other items within said inventory storage area.

21. The computer-accessible storage medium as recited in claim 13, wherein to instruct said first agent to select said particular item from said inventory storage area, the program instructions are further computer-executable to instruct said first agent to select said particular item from a pick module located within said inventory storage area.

22. The computer-accessible storage medium as recited in claim 13, wherein said program instructions are further computer-executable to instruct a third agent to retrieve said particular item from an inventory receiving area for restocking within said inventory storage area, wherein instructing said first agent to select said particular item from said inventory storage area comprises instructing said third agent to transfer said particular item to said first agent.

23. The computer-accessible storage medium as recited in claim 13, wherein the instructions are further computer-executable to instruct a particular one of said plurality of agents to package said particular item for shipment subsequent to said particular item being delivered to said corresponding order processing area.

24. The computer-accessible storage medium as recited in claim 13, wherein the instructions are further computer-executable to dynamically determine said respective paths of said plurality of agents in response to evaluating a current system state, wherein said current system state includes state information associated with said plurality of agents and said customer orders.

25. A fulfillment center configured to fulfill orders, said fulfillment center comprising:
a plurality of receiving stations configured to receive items for storage;
a plurality of pick modules configured to store said received items;
a plurality of packing stations configured to package items selected from said pick modules;
a plurality of exchange stations interspersed among said pick modules; and
a control system configured to:
instruct a first one of a plurality of agents moving along a respective path within said fulfillment center to select each of a first plurality of items from one or more of said pick modules, wherein each of said first plurality of items is specified in a corresponding customer order, wherein each of said first plurality of items is designated to be delivered to a corresponding packing station, and wherein at least two of said plurality of items selected by the first agent are designated to be delivered to two different corresponding packing stations by different ones of said agents;
subsequent to said first agent selecting a particular one of said first plurality of items and prior to said particular item being delivered to any order processing area, instruct said first agent to transfer said particular item to a second one of said plurality of agents via a particular one of said exchange stations, wherein to instruct said first agent to transfer said particular item, the control system is further configured to instruct said first agent to transfer physical possession of said particular item to said second agent, such that transfer of said particular item occurs during conveyance of said particular item to said corresponding order processing area; and
instruct said second agent or another one of said plurality of agents to deliver said particular item to said corresponding packing station.

26. The fulfillment center as recited in claim 25, wherein to instruct said first agent to select said particular item, said control system is further configured to instruct said first agent to place said particular item into a container corresponding to said customer order.

27. The fulfillment center as recited in claim 26, wherein said control system is further configured to instruct said second agent to transfer said particular item a third one of said plurality of agents, wherein said transferring from said second agent to said third agent comprises said second agent exchanging said container including said particular item with said third agent.

28. The fulfillment center as recited in claim 25, wherein to instruct a transfer of said particular item from said first agent to said second agent, said control system is further configured to instruct said first agent to deposit said particular item at said particular exchange station and to instruct said second agent to subsequently retrieve said particular item from said particular exchange station.

29. The fulfillment center as recited in claim 25, wherein said control system is further configured to instruct said second agent to select a different item specified in a corresponding customer order from another one of said plurality of pick modules subsequent to said first agent transferring said particular item to said second agent.

30. The fulfillment center as recited in claim 25, wherein subsequent to said first agent transferring said particular item to said second agent, said control system is further configured to instruct said second agent to deliver said particular item to said corresponding order processing area, wherein said second agent does not select any other items from said inventory storage area prior to or subsequent to said transferring.

31. The fulfillment center as recited in claim 25, wherein said control system is further configured to instruct said first agent to select one or more other items from one of said plurality of receiving areas, and while moving along said respective path, to restock said one or more other items within one or more corresponding pick modules.

32. The fulfillment center as recited in claim 25, wherein said control system is further configured to:
  instruct said first agent to select one or more other items from one of said plurality of receiving areas and to transfer said one or more other items to a third one of said plurality of agents subsequent to selecting said one or more other items; and
  instruct said third agent or another one of said plurality of agents to restock said one or more other items within one or more corresponding pick modules.

33. The fulfillment center as recited in claim 25, wherein said control system is further configured to instruct a third agent to retrieve said particular item from a receiving station for restocking within one or more corresponding pick modules, and wherein said control system instructing said first agent to select said particular item from said one or more pick modules comprises said control system instructing said third agent to transfer said particular item to said first agent.

34. The fulfillment center as recited in claim 25, wherein said receiving stations and said packing stations are interspersed in a substantially alternating fashion.

35. The fulfillment center as recited in claim 34, wherein each of said receiving stations is associated with a corresponding inbound dock, and wherein each of said packing stations is associated with a corresponding outbound dock.

36. The fulfillment center as recited in claim 25, wherein said control system is further configured to dynamically determine said respective paths of said plurality of agents in response to evaluating a current system state, wherein said current system state includes state information associated with said plurality of agents and said customer orders.

37. A computer system, comprising:
  a system memory; and
  a processor coupled to said system memory, wherein said processor is configured to execute instructions, and wherein said instructions are configured to:
    instruct a first one of a plurality of agents to select each of a plurality of items from an inventory storage area, wherein each of said plurality of agents moves along a respective path within said inventory storage area, wherein each of said plurality of items is specified in a corresponding customer order, wherein each of said plurality of items is designated to be delivered to a corresponding order processing area, and wherein at least two of said plurality of items selected by the first agent are designated to be delivered to two different corresponding order processing areas by different ones of said agents;
    subsequent to said first agent selecting a particular one of said plurality of items and prior to said particular item being delivered to any order processing area, instruct said first agent to transfer said particular item to a second one of said plurality of agents, wherein to instruct said first agent to transfer said particular item, the instructions are further executable to instruct said first agent to transfer physical possession of said particular item to said second agent, such that transfer of said particular item occurs during conveyance of said particular item to said corresponding order processing area; and
    instruct said second agent or another one of said plurality of agents to deliver said particular item to said corresponding order processing area.

38. The computer system as recited in claim 37, wherein to instruct said first agent to select said particular item, the instructions are further configured to instruct said first agent to place said particular item into a container corresponding to said customer order.

39. The computer system as recited in claim 38, wherein to instruct said first agent to transfer said particular item to said second agent, the instructions are further configured to instruct said first agent to exchange said container including said particular item with said second agent.

40. The computer system as recited in claim 37, wherein to instruct said first agent to transfer said particular item to said second agent, the instructions are further configured to instruct said first agent to deposit said particular item at an exchange station and instructing said second agent to subsequently retrieve said particular item from said exchange station.

41. The computer system as recited in claim 37, wherein the instructions are further configured to:
  subsequent to said first agent transferring said particular item to said second agent, instruct said second agent to select a different item specified in a corresponding customer order from said inventory storage area.

42. The computer system as recited in claim 37, wherein the instructions are further configured to:
  subsequent to said first agent transferring said particular item to said second agent, instruct said second agent to deliver said particular item to said corresponding order processing area, wherein said second agent does not select any other items from said inventory storage area prior to or subsequent to said transferring.

43. The computer system as recited in claim 37, wherein the instructions are further configured to:
  instruct said first agent to select one or more other items from a receiving area; and
  while said first agent moves along said respective path, instruct said first agent to restock said one or more other items within said inventory storage area.

44. The computer system as recited in claim 37, wherein the instructions are further configured to:
  instruct said first agent to select one or more other items from a receiving area;
  subsequent to said first agent selecting said one or more other items, instruct said first agent to transfer said one or more other items to a third one of said plurality of agents; and
  instruct said third agent or another one of said plurality of agents to restock said one or more other items within said inventory storage area.

45. The computer system as recited in claim 37, wherein to instruct said first agent to select said particular item from said inventory storage area, the instructions are further configured to instruct said first agent to select said particular item from a pick module located within said inventory storage area.

46. The computer system as recited in claim 37, wherein said instructions are further configured to instruct a third agent to retrieve said particular item from an inventory receiving area for restocking within said inventory storage area, wherein instructing said first agent to select said particular item from said inventory storage area comprises instructing said third agent to transfer said particular item to said first agent.

47. The computer system as recited in claim 37, wherein the instructions are further configured to instruct a particular one of said plurality of agents to package said particular item for shipment subsequent to said particular item being delivered to said corresponding order processing area.

48. The computer system as recited in claim 37, wherein the instructions are further configured to dynamically determine said respective paths of said plurality of agents in response to evaluating a current system state, wherein said current system state includes state information associated with said plurality of agents and said customer orders.

* * * * *